US000001836H

United States Statutory Invention Registration [19]

[11] Reg. Number: H1,836

Fletcher et al.

[45] Published: Feb. 1, 2000

[54] INTEGRATED TELECOMMUNICATIONS SYSTEM

[76] Inventors: Anthony G. Fletcher, 605 Dunwick Cove; Scott D. Hoffpauir, 747 Vivian Leigh Cove, both of Collierville, Tenn. 38017

[21] Appl. No.: 09/025,870

[22] Filed: Feb. 19, 1998

Related U.S. Application Data

[60] Provisional application No. 60/060,107, Sep. 26, 1997.

[51] Int. Cl.[7] ..... H04Q 7/20

[52] U.S. Cl. ..... 455/433

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applictions*", 1996, pp.1–16, Celcore, Inc., Memphis, TN.

"*GlobalHub Mobility Manager–Enables" One Number-"PCS Service Via Motorola PPS Residential Products*" pp. 1–2, Celcore, Inc Memphis, TN. 1996.

"*IS–41 Network Hub–The Mobility Manager for Celcore's GlobalSystem*" pp. 1–2, Celcore, Inc Memphis, TN. 1996.

"*GlobalHub*" pp.1–10, Celcore, Inc,. Memphis TN. 1996.

John Scourias, "*Overview of the Global System for Mobile Communications*", Mar. 27,1996 pp. 1–16, John Scourias.

Martin A. Iroff & Steve Chen, "*A distributed GSM Architecture for Low–Traffic Density Markets*", Mobil Communications International, Oct 1996, pp. 1–3, IBC Busines Publishing, London, GBX.

Information pamphlet, Feb. 1997, pp. 1–7, Version 1.0, Celcore, Inc., Memphis, TN.

"*BS–2Q/BS–21, D900/D1800 Base Transceiver Station*", pp. 1–2, Geschaftszweig Mobilfunknetze, Munchen, DEX. 1997.

"*Unique Solutions to Complex Challenger of Wireless carriers*" pp.1–9, Celcore, Inc,. Memphis, TN. 1997.

Michel Mouly and Marie–Bernadette Pautet "*The GSM system for Mobile Communications*", 1992 pp.79–122, pp.261–646, Cell & Sts, FRX.

LAWRENCE HARTE, STEVER PROKUP, and RICHARD LEVINE "*Cellular and PCS, The Big Picture*", 1997, pp.61–181, McGraw–Hill, United States of America.

GEORGE LAMB "*GSM made SIMple*", pp. 3–158, Regal Printing United States of America.

*Primary Examiner*—Daniel T. Pihulic

[57] ABSTRACT

The present invention, as described and claimed, provides for an integrated wireless telecommunications system. Such telecommunications system integrates functionality and elements that are commonly found in distinct components of conventional wireless telecommunications systems. For example, the telecommunications system may includes a radio controller and switching center.

27 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRATED TELECOMMUNICATIONS SYSTEM

CLAIM OF PRIORITY

The instant patent application claims priority from the United States provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is directly related to the following patent applications: (a) the United States utility patent application designated by DSC Case No. 827-00 and Attorney Docket No. 24194000.173, entitled "Flexible Telecommunications System Architecture," naming Anthony G. Fletcher and Scott D. Hoffpauir as inventors, and which was filed concurrently with the instant patent application; (b) the United States utility patent application designated by DSC Case No. 835-00 and Attorney Docket No. 24194000.181, entitled "Resource Management Sub-System of a Telecommunications Switching System," naming Howard L. Andersen and Scott D. Hoffpauir as inventors, and which was filed concurrently with the instant patent application; (c) the United States utility patent application designated by DSC Case No. 836-00 and Attorney Docket No. 24194000.182, entitled "Generic Wireless Telecommunications System," naming Anthony G. Fletcher and Scott D. Hoffpauir as inventors, and which was filed concurrently with the instant patent application; (d) the United States utility patent application designated by DSC Case No. 830-00 and Attorney Docket No. 24194000.176, entitled "Agent Interworking Protocol and Call Processing Architecture for a Communications System," naming Scott D. Hoffpauir, Steve B. Liao and Kelvin K. Kinsey as inventors, and which was filed concurrently with the instant patent application; and (e) U.S. patent application Ser. No. 08/678,254, entitled "Multi-Channel Transcoder Rate Adapter Having Low Delay and Integral Echo Cancellation," naming James M. Davis and James D. Pruett as inventors, and which was filed Jul. 11, 1996.

FIELD OF THE INVENTION

The present invention relates to a telecommunications system, and more particularly, a telecommunications system that integrates elements and resources conventionally included in distinct equipment.

BACKGROUND

Conventional wireless telecommunications systems are composed of several distinct pieces of interconnected equipment, each carrying out various functions. For instance, a conventional wireless telecommunications system, designed pursuant to the current Global System for Mobile Communications (abbreviated GSM) standard, includes (a) a base station controller component, (b) multiple base transceiver stations, (c) a mobile switching center, (d) a visitor location register (sometimes integrated with the mobile switching center), (e) a home location register, (f) an authentication center, (g) an operation maintenance center radio component for configuring the base station controller and (h) an operation maintenance center switching component for configuring the home location register and/or the mobile switching center. The costs associated with the manufacture and maintenance of such equipment, and the connections between such equipment, is relatively high. Furthermore, the complexity of the system is increased by providing for distinct components. Moreover, significant expenditures of time and resources are incurred in redesigning such components and equipment given the interdependence among such components and equipment. As a result, the ability to redesign such equipment or add elements is severely limited.

Separation of components of a wireless telecommunications system presents numerous disadvantages. For example, consider a base station controller and a mobile switching center of a conventional GSM telecommunications system. Conventionally, the base station controller is remotely located with respect to the mobile switching center, and telecommunications lines are used to connect the base station controller with the mobile switching center. In some cases, the radio controller and the mobile switching center may be separated by a considerable distance, known as the back-haul, which requires considerable installation and maintenance efforts. Voice, data, control and connection related information are passed over the telecommunications lines from the base station controller to and from the mobile switching center. One protocol is typically used to communicate between the base station controller and its associated subscriber units (such as, a link level protocol) while another protocol is used to communicate between the base station controller and the mobile switching center (such as, a SS7 protocol). Typically, multiple SS7 links connect the base station controller and mobile switching center. The base station controller and its associated equipment carry out various procedures with respect to the information received from subscriber units over radio channels, such as transcoding and rate adaption functions. Performance of such functions by equipment associated with the base station controller requires the use of additional overhead to supply control information to the mobile switching center, and thus undesirably increases the complexity of the communications with the mobile switching center.

Several significant disadvantages are thus encountered by conventional wireless telecommunications systems. What is therefore needed is a telecommunications system that integrates together components and their associated functionality, which are presently distributed among a series of distinct equipment, to overcome such disadvantages.

SUMMARY OF THE INVENTION

The present invention sets out to, among other things, overcome the aforementioned problems associated with conventional wireless telecommunications systems by integrating the functionality of distinct components within a common system.

One object of the present invention is to provide a telecommunications system that integrates various elements and components conventionally found in distinct equipment, including integrating a radio controller that controls one or more base stations and a switching center for switching calls to and from subscribers of the telecommunications system.

Another object of the present invention is to optimize the interface and communications between the various elements of a telecommunications system, including the interface provided between a switching center and base stations.

Yet another object of the present invention is to minimize the connectivity requirements and overhead associated with the various elements of a telecommunications system, including connections between a switching center and base stations.

Still another object of the present invention is to reduce the cost associated with producing a telecommunications system.

A further object of the present invention is to minimize complexity and maximize the ability to modify, including adding additional functionality and elements to, a telecommunications system.

In accordance with the present invention, an integrated wireless telecommunications system, and methods associated with that system, are provided to overcome the problems associated with conventional wireless telecommunications systems. Such integrated telecommunications system includes a radio controller, such as a base station controller pursuant to the GSM standard, to control and coordinate the operation of one or more base stations that communicate with multiple subscriber units over radio traffic channels. That telecommunications system further includes a switching center, such as a mobile switching center pursuant to the GSM standard, for switching calls directed to or initiated by the subscriber units. The radio controller and switching center may be implemented as software entities within a call processor assembly. As such, the radio controller and call processor may be logically connected to one another. Other software entities, such as a home location register and a visitor location register, are also preferably provided within the call processor assembly.

Significant advantages are gained by integration of the radio controller together with the switching center. Obvious advantages from such integration include, for example, the reduction in complexity and the resulting enhanced performance and cooperation of the radio controller and switching center, the ability to jointly modify and configure the radio controller and switching center, and the resulting lower costs of construction. Another advantage is the elimination of a wireline connection between the radio controller and the switching center as well as control signaling between those elements, such as SS7 signaling. Yet another advantage is the ability for the switching center to be able to directly communicate with the base stations through a link level protocol, i.e., the same protocol by which the radio controller communicates with the base stations.

According to one aspect of the present invention, a resource assembly is also provided within the telecommunications system. That resource assembly includes resources that can be employed by elements of the call processor assembly. One resource of the resource assembly may be a switch that can be utilized by both the radio controller and the switching center to carry out switching functions. A transcoder and rate adapter unit may also be included in the resource assembly to transcode and adapt signals received from the base stations. Integration of transcoding and rate adaption functions in the telecommunications system significantly enhances the efficiency of the signals passed to and from the telecommunications system. That is, by such integration, multiple radio traffic channels can be compressed within a single digital channel carried over a link from the base stations to the telecommunications system. As a result, the number of links connected to the telecommunications system is significantly decreased.

According to yet another aspect of the present invention, a network management system is associated with the telecommunications system. Such network management system is connected to, and operable to configure and store information associated with, various elements and resources of the call processor assembly and resource assembly.

Other and further objects, aspects, features and advantages of the present invention will be apparent from the following detailed description of an exemplary embodiment of the invention, given for the purpose of disclosure and taken in conjunction with the accompanying drawings.

BRIEF DESCRIPTION OF THE DRAWINGS

The present invention may be better understood from the following detailed description of an exemplary embodiment of the present invention with reference to the accompanying drawings, in which.

DETAILED DESCRIPTION OF AN EMBODIMENT OF THE PRESENT INVENTION

Figure 1:
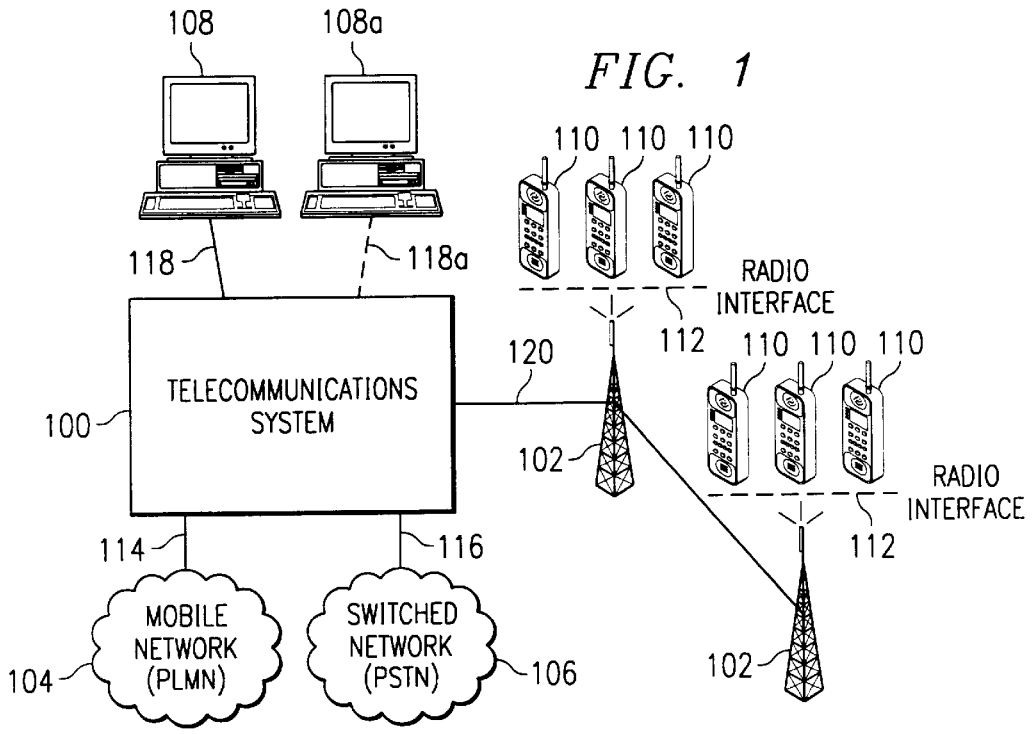
FIG. 1 is a diagram that illustrates an integrated telecommunications system and certain connections associated with that telecommunications system, in accordance with an exemplary embodiment of the present invention.

FIG. 1 illustrates an integrated, wireless telecommunications switching system 100 and certain connections associated with that telecommunications system 100, in accordance with an exemplary embodiment of the present invention. The telecommunications system 100 is operable to provide speech and data services to multiple subscriber units 110. Each subscriber unit 110 provides an interface to a human user, such as through use of a microphone, loudspeaker, display or keyboard of a subscriber unit, or provides an interface to terminal equipment, such as an interface towards a personal computer or facsimile machine, or both. While the subscriber units 110 are illustrated in FIG. 1 as hand held mobile units, it should be appreciated that the implementation of the subscriber units 110 is not so limited. For example, the subscriber units 110 may comprise a fixed antenna assembly connected to a telephone or other interface device. A smart card (not illustrated) may be embodied within a subscriber unit 110 to provide such subscriber unit with subscriber related information and encryption keys.

Communications to and from the subscriber units 110 are established over a radio interface 112 by one or more base stations 102. Base stations 102 directly communicate with subscriber units 110 over radio frequency signals transmitted from, and received by, the base stations over the radio interface 112. Base stations 102 may, for example, include radio transmission and reception devices, antenna assemblies, signaling processing logic specific to the radio interface 112 between the base stations and the subscriber units 110.

A base station 102 is preferably responsible for providing communications to subscriber units 110 located within a particular region, commonly referred to as a service area or cell. One or more base stations 102, typically in a common area, may be logically grouped into what is commonly referred to as a base station site.

The telecommunications system 100 is connected to the base stations 102 by a link 120, such as an E1 or T1 telecommunications line, that provides one or more suitable transmission channels. Digital representations of speech or data information are transmitted over the link 120 between the telecommunications system 100 and the base stations 102, at a predetermined transmission rate.

The telecommunications system 100 is further connected to a mobile network 104 over a link 114 and a switched network 106 over another link 116. A switched network 106 (for example, the Public Switched Telephone Network or PSTN), typically carries voice and data services to fixed locations. Signals transmitted over the switched network link 116 may therefore include ISUP and R2 type signals. A mobile network 104 (for example, the Public Land Mobile Network or PLMN) typically carries data related to mobile or subscriber units. Signals transmitted over the mobile network link 114 may therefore include SS7 and MAP type signals in addition to R2 and ISUP type trunks.

Configuration of the telecommunications system 100 is preferably accomplished by a graphical user interface associated with a local terminal 108 over a wireline connection 118 or associated with a remote terminal 108*a* over a modem link 118*a*.

Figure 2:
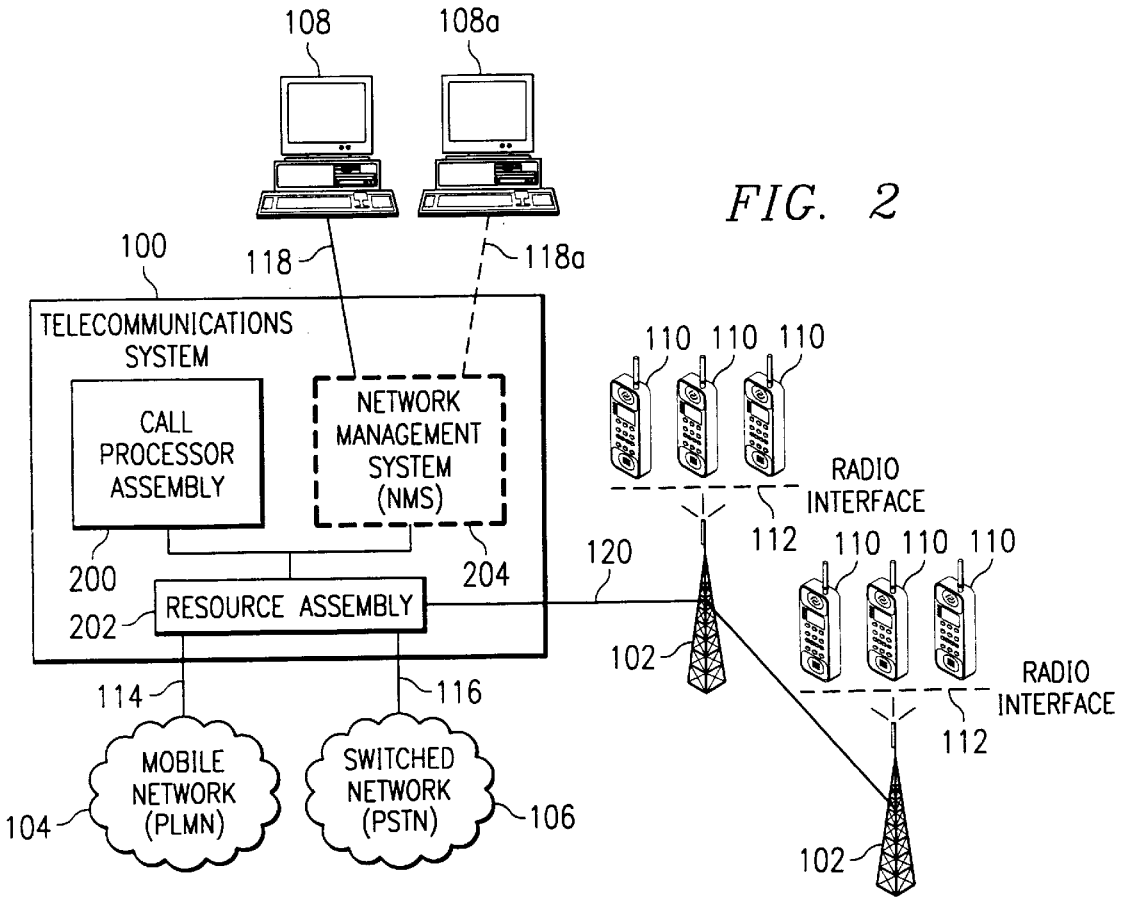
FIG. 2 is a diagram that illustrates various assemblies and systems that may be included within a telecommunications system, in accordance with an exemplary embodiment of the present invention.

FIG. 2 illustrates various assemblies and systems that may be included within the telecommunications system 100, in accordance with an exemplary embodiment of the present invention.

A resource assembly is preferably included within the telecommunications system 100. That resource assembly 202 is preferably connected, either directly or indirectly, to base stations 102 over one link 120, a switched network 106 over another link 116, and a mobile network 104 over yet another link 114. Within the telecommunications system 100, the resource assembly 202 is preferably connected to a call processor assembly 200 as well as a network management system 204. The resource assembly 202, in addition to providing an interface to base stations 102, a switched network 106 and a mobile network 104, includes resources that are available to be employed by the call processor assembly 200.

The call processor assembly 200 includes elements that are operable to process calls directed to, or received from, subscriber units 110, a switched network 106 and a mobile network 104. The call processor assembly 200 is operable to handle call processing functions needed by the telecommunications system 100, including call origination, location updating, handovers between cells, trunking and call termination. The call processor assembly 200 may include a general purpose computing platform, such as an Intel Pentium II based computing platform, that includes suitable hardware and/or software systems to support call processing functions. The call processor assembly 200 may use a real-time operating system, such as a QNX operating system, to support the real-time call processing requirements of telecommunications system 100.

As illustrated in FIG. 2, the network management system 204 may be embodied within the telecommunications system 100 or external to the telecommunications system 100. As discussed further below, certain elements of the network management system 204 are preferably provided within the telecommunications system 100 while others are provided externally. However, the present invention may be practiced regardless of how the network management system 204 is implemented.

It should also be appreciated that while the call processor assembly 200, resource assembly 202 and network management system 204 are illustrated as distinct entities, some or all of the functionality of those entities may nevertheless be integrated into a single entity consistent with the spirit and scope of the present invention.

Figure 3:
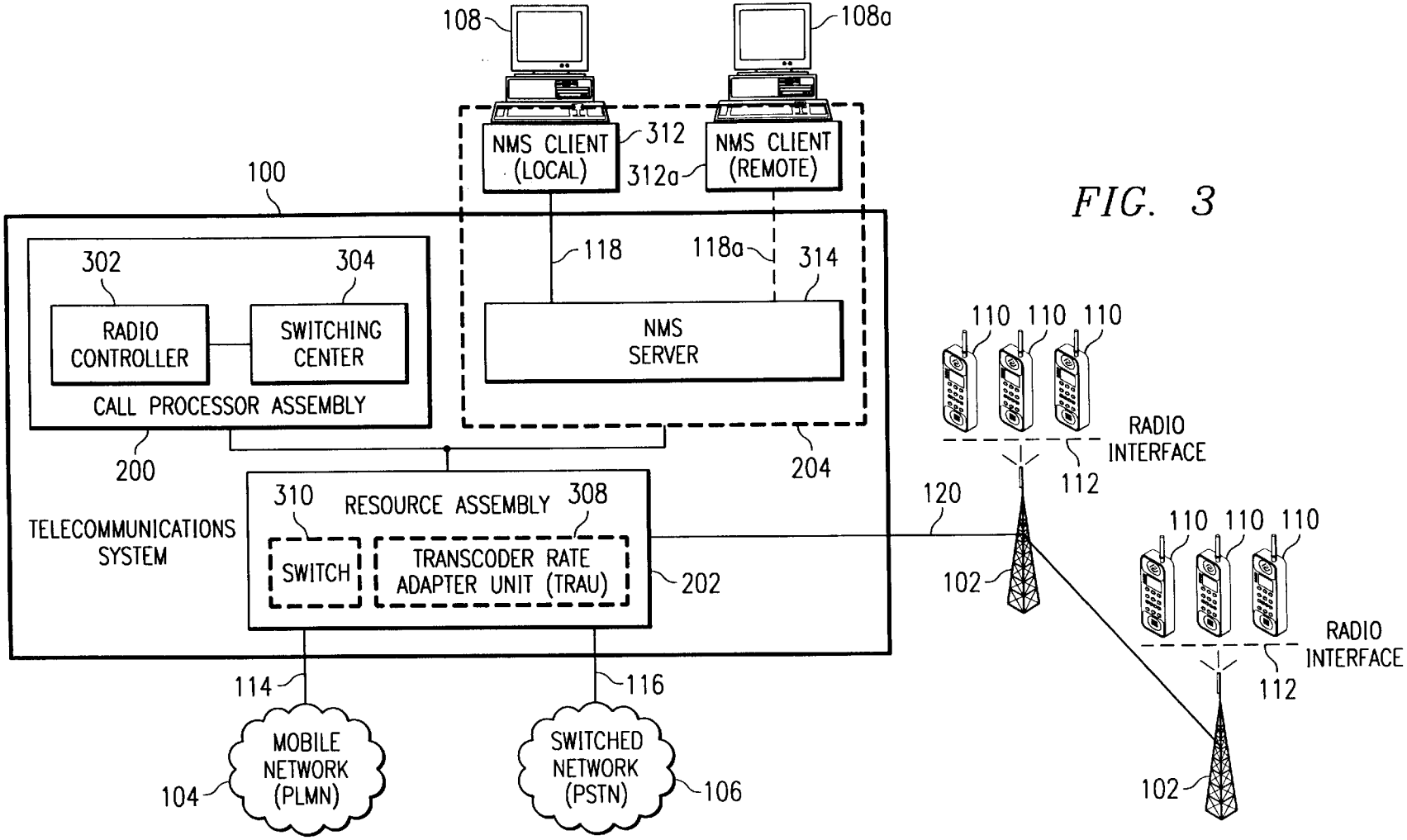
FIG. 3 is a diagram that illustrates various assemblies and systems that may be included within a telecommunications system, together with certain elements and resources associated with the telecommunications system, in accordance with an exemplary embodiment of the present invention.

FIG. 3 illustrates various assemblies and systems that may be included within the telecommunications system 100, together with certain elements and resources associated with that telecommunications system 100, in accordance with an exemplary embodiment of the present invention. The call processor assembly 200 of the telecommunications system 100 preferably includes two elements, namely, a radio controller 302 together with a switching center 304.

The radio controller 302 is responsible for management of base stations 102 and their radio interfaces 112, including the allocation and release of radio channels associated with a given radio interface 112 and management of handovers from one base station 102 to another base station 102. The radio controller 302 manages radio transmission equipment associated with base stations 102 and may be responsible for management of radio interfaces 112 through the allocation, release, and handover of radio transmission channels. The radio controller 302 may carry out various procedures that relate to call connection tasks. For example, the radio controller 302 may be responsible for system information broadcasting, subscriber paging, immediate traffic channel assignment, subsequent traffic channel assignment, call handover, radio connection and release, connection failure detection and reporting, and power capability indication reporting. One example of a radio controller 302 is a base station controller, as provided for by the GSM standard, which is discussed below with respect to FIG. 4.

The radio controller 302 interfaces with the resource assembly 202 for the provision of various resources employed by the radio controller 302, as well as for access to links 120 to the base stations 102. The radio controller 302 further interfaces with the network management system 204 for fault, configuration, and performance management of both the radio controller 302 and the base stations 102.

The switching center 304 coordinates the allocation and routing of calls involving the subscriber units 110 of the telecommunications system 100 by, among other things, receiving and processing dialed digits, interpreting call processing tones and providing routing paths. For example, the switching center 304 is operable to process a service request from a subscriber unit 110, and route a corresponding call to the designated switched network 106 or a mobile network 104 or to another subscriber unit 110. Similarly, the switching center 304 is operable to process a service request from a mobile network 104 or switched network 106, and route a corresponding call to a designated subscriber unit 110. One example of a switching center 304 is a mobile switching center, as provided for by the GSM standard, which is discussed below with respect to FIG. 4.

The switching center 304 interfaces with the radio controller 302 to cause radio resources, including radio traffic channels, to be allocated for communication with subscriber units 110. The switching center 304 interfaces with the resource assembly 202 for, among other things, trunk management (such as tone generation, digitized announcements and digit collection) and switching functions. It interfaces with the network management system 204 for fault management, configuration management, performance management and accounting management.

The radio controller 302 and the switching center 304 are preferably implemented in software as distinct software entities or components that are logically connected to one another, which is executed by one or more processors. Such implementation is preferable since, among other reasons, software is presently more readily modified to reflect desired changes in the radio controller 302 and/or switching center 304. A software entity, as used herein, is a unit of software that encapsulates a related set of procedures and data. A software entity may comprise one or more software objects that collectively model, for example, a particular component. One example of a software entity is a composite software object. It is, however, readily appreciable that such elements may be implemented in numerous other ways within the spirit and scope of the present invention. For example, the radio controller 302 or switching center 304 can be implemented within one or more integrated circuits within the scope of the present invention.

As illustrated in FIG. 3, the resource assembly 202 includes multiple resources. A transcoder and rate adapter may be provided within the resource assembly 202. Such components may be collectively implemented within a single unit, commonly referred to as a transcoder rate adapter unit 308 (abbreviated TRAU). The transcoder rate adapter unit 308 is operable to transcode and adapt the rate of signals transmitted between base stations 102. For example, the transcoder rate adapter unit 308 may translate multiple 16,000 bits per second signals, which include encoded speech or data, to a 64,000 bits per second signal. Echo cancellation resources may also be provided within the resource assembly 202 and integrated together with the transcoder and rate adapter unit 308. Another resource, namely, a switch 310 may also be included in a resource assembly 202. The switch 310 is responsible for carrying out switching functions requested by the call processor assembly 200, and may, for example, be a switching matrix or other suitable component. The switch 310 is able to be shared, and thus commonly utilized, by both the radio controller 302 and the switching center 304. That is, a separate switch is not required for the radio controller 302 as well as the switching center 304, as is the case with conventional wireless telecommunications systems.

By integrating the radio controller 302 and other related functionality within the telecommunications system 100, several advantages are attained. One advantage is the elimination of a wireline connection between the radio controller 302 and the switching center 304 as well as control signaling between those elements, such as SS7 signaling. Another advantage is the ability for the switching center 304 to be able to directly communicate with the base stations 102 through a link level protocol (for example, a Link Access Procedure D protocol). Further, in environments that require transcoding and rate adaption functions, such as those operating in accordance to the GSM standard, the integration of such functions within a telecommunications system 100 significantly enhances the efficiency of the signals passed to and from the telecommunications system. Such efficiency is best appreciated by considering, for example, a digital channel carried over a link 120 from the base stations 102 to the telecommunications system 100, such as a DS-O channel. A digital channel provided to a conventional GSM system contains information corresponding to a single radio traffic channel as a result of transcoding and rate adaption. However, in accordance with the present invention, multiple radio traffic channels can be compressed within a single digital channel that is provided to the telecommunications system 100 since transcoding and rate adaption functions are carried out by the telecommunications system 100 itself. As a result, the number of links 120 connected to the telecommunications system 100 is significantly decreased.

Preferably, the network management system 204 is separated into a client part and a server part, respectively referred to herein as the NMS client 312 and the NMS server 314. The NMS client 312 provides a graphical user interface to an operator of the telecommunications system 100. Accordingly, the NMS client 312 of the network management system 204 is preferably external to the telecommunications system 100 and is provided for use together with both the local terminal 108 and the remote terminal 108*a*. The graphical user interface of the NMS client 312 allows the operator to configure various settings, provide other information (including subscriber related information), monitor, operate, test and diagnose problems associated with the telecommunications system 100. The NMS client 312 and its terminal 108 may be collectively implemented within a standalone workstation. In contrast, the NMS server 312 of the telecommunications system 100 is preferably embodied within the telecommunications system 100. The NMS server 312 is operable to store and manage information provided to it by the local or remote NMS client 312/312*a* and used by the call processor assembly 200 or the resource assembly 202.

Figure 4:
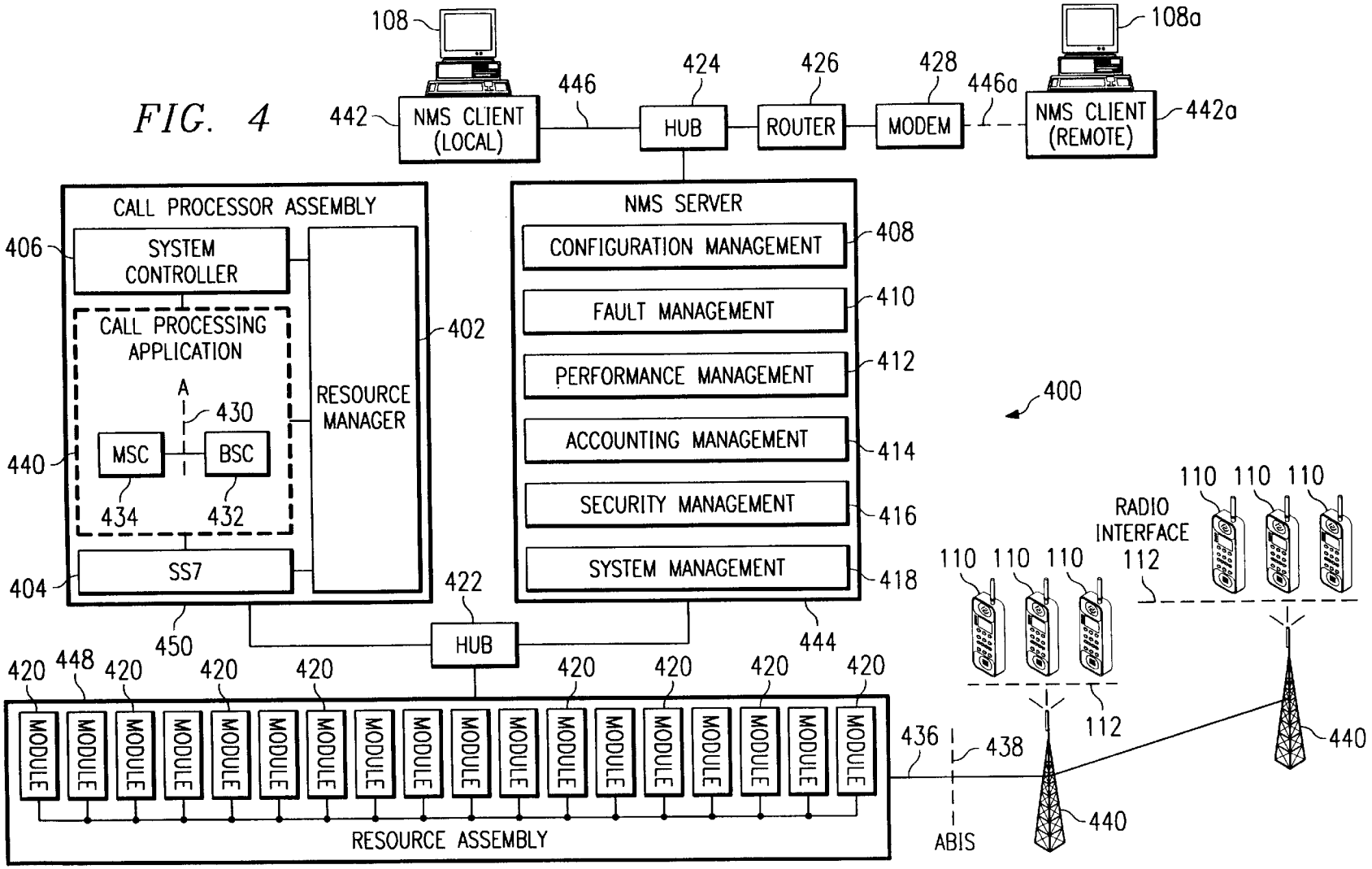
FIG. 4 is a diagram that illustrates a telecommunications system, designed consistent with the GSM standard and in accordance with an exemplary embodiment of the present invention.

FIG. 4 illustrates a telecommunications system 400, designed consistent with the GSM standard and in accordance with an exemplary embodiment of the present invention.

In accordance with the GSM standard, one or more base transceiver stations 440 are provided to communicate with subscriber units 110 over a radio interface 112. Such base transceiver stations 440 are connected to the resource assembly 448 through a link 436, which provides one or more suitable transmission channels. Digital representations of speech or data information are transmitted over the link 436 at a predetermined transmission rate. Such link 436 may, for example, be an E1 or T1 telecommunications line.

The interface 438 between base transceiver stations 440 and a base station controller 432 is, pursuant to the GSM standard, known as the Abis interface. The Abis interface 438 provides message flow between a base station controller 432 and base transceiver stations 440, and also manages message flow between subscriber units 110 and other network elements. The Abis interface 438 is thus interposed between base transceiver stations 440 and the telecommunications system 400 itself. Digital representations of speech or data information are transmitted through the Abis interface 438, that is, between the telecommunications system 400 and the base transceiver stations 440, at a predetermined transmission rate. For example, digital representations of speech or data information may be transmitted over the link 120 connecting the base transceiver stations at a rate of 16,0000 bits per second.

The call processor assembly 450 preferably includes a call processing application 440 which includes, among other elements, a base station controller 432 (abbreviated BSC) and a mobile switching center 434 (abbreviated MSC), which is sometimes also referred to as a mobile services switching center. Signaling and voice data is exchanged between the interface between the base station controller 432 and mobile station controller 434, known as the A interface 430.

The base station controller 432 is responsible for management of the base transceiver stations 440 and their radio interfaces 112, including the allocation and release of radio channels associated with a given radio interface 112 and management of handovers from one base transceiver station 112 to another base transceiver station 112. The base station controller 432 manages the base transceiver stations 440 and their radio interfaces 112 through the allocation, release and handover of radio transmission channels. The base station controller 432 may carry out various procedures that relate to call connection tasks. For example, the base station controller 432 may be responsible for system information broadcasting, subscriber paging, immediate traffic channel assignment, subsequent traffic channel assignment, call handover, radio connection and release, connection failure detection and reporting, and power capability indication reporting. The base station controller 432 may also be responsible for management of both the Abis interface 438 and the A interface 430.

The mobile switching center 434 coordinates the allocation and routing of calls involving the subscriber units 110 of the telecommunications system 400 by, among other things, receiving dialed digits, interpreting call processing tones and providing routing paths. For example, the mobile switching center 434 is operable to process a service request from a subscriber unit 110, and route a corresponding call to the designated switched network 106, a mobile network 104 or to another subscriber unit 110. Similarly, the mobile switching center 434 is operable to process a service request from a mobile network 104 or switched network 106, and route a corresponding call to a designated subscriber unit 110. The mobile switching center 434 is primarily responsible for mobility management, call control and trunking, such as coordinating the setting-up and termination of calls to and from subscriber units 110. Additionally, it provides all of the functionality needed to handle mobile subscribers units 100 through location updating, handover and call delivery.

The interface between the base station controller 432 and the mobile switching center 434 is, pursuant to the GSM standard, known as the A interface 430. The A interface 430 provides the link for managing traffic channels/transcoders, and also provides the mobile switching center 434 with access to base transceiver stations 112 for message flow with the subscriber units 110. The Base Station Subsystem Management Application Part (abbreviated BSSMAP) protocol may be employed to transmit connection-related messages and paging messages between the mobile switching center 434 and base station controller 432. Preferably, the base station controller 432 and the mobile switching center 434 are implemented as distinct entities, such as separate software objects that communicate with one another so that the A interface 430 is logically discernible.

In addition to the call processing application 440, the call processor assembly 450 preferably includes several other elements, namely, a resource manager 402, a SS7 element 404 and a system controller 406. While the resource manager 402 is preferably included in the call processor assembly 450, it may also be included in the resource assembly 448 within the scope of the present invention.

Management and allocation of resources provided by the resource assembly 448 with respect to the call processor assembly 450 is carried out by the resource manager 402. That is, the resource manager 402 acts as the bridge between the call processing application 440 and the resource assembly 448 by enabling different elements of the call processing application 440 to interface with resources of the resource assembly 448. Preferably, the resource manager 402 also provides an interface to resources of the resource assembly 448 for the SS7 element 404 as well as remote elements, such as the system controller 406 and various elements of the network management system 204.

The resource manager 402 is preferably implemented in software as a software entity that comprises one or more software objects. It preferably interfaces with other software entities through the use of object request broker technology. In accordance with an exemplary embodiment, the resource manager 402 provides a proxy for other software entities in which the resource manager 402 may seek to invoke a method or operation. Similarly, a proxy may be associated with a software entity other than the resource manager 402 which may seek to invoke a method or operation associated with the resource manager 402. An interface is preferably defined between each such proxy to establish acceptable messages and responses that can be exchanged over the defined interface so as to allow a virtual connection to be formed therebetween. The SS7 element 404 provides the logic needed to provide SS7 signaling functionality for SS7 connectivity to a switched network 106. It is responsible for performing various functions and interfaces associated with the various parts and protocols that are included within SS7 signals. Further details of the resource manager 402 and the SS7 element 404 are provided in the United States utility patent application designated by DSC Case No. 835-00 and Attorney Docket No. 24194000.181, entitled "Resource Management Sub-System of a Telecommunications System," naming Howard L. Andersen and Scott D. Hoffpauir as inventors, filed concurrently with the instant patent application, and which is incorporated by reference herein for all purposes.

The system controller 406 is responsible for ensuring that the call processor assembly 450 is operating properly by periodically testing elements of the call processor assembly 450. A successful test of an element of the call processor assembly 450 may comprise, for example, observing a predetermined response from the element after sending a predetermined message to the element. This is sometimes referred to as "pinging" an element.

The NMS server 444 includes several elements for configuring and managing elements of the call processor assembly 450 and resources of the resource assembly 448. Specifically, the NMS server 444 includes the following elements: configuration management 408, fault management 410, performance management 412, accounting management 414, security management 416, and system management 418. Those elements are operable to provide operations, administration and maintenance related services, and preferably include one or more logical servers.

The configuration management element 408 includes one or more servers to provide services necessary to administer the configurable attributes of the main functional elements associated with the call processing application 440, the resource manager 402 and the SS7 element 404. As such, the configuration management element 408 is operable to modify configuration information associated with the call processing application 440, such as administration of subscriber databases, as well as the configuration of specific elements of the call processing application, such as the base station controller 432 and mobile switching center 434. Servers of the configuration management element 408 preferably contain software objects that retain attribute information so as to allow an operator to configure the corresponding functional component of the call processing application 440, the resource manager and the SS7 element 404. The fault management element 410 provides for the detection, logging and reporting of alarms, errors, and selected events from the call processor assembly 450 and the resource assembly 448. The performance management element 412 provides for the periodic collection and analysis of system performance and traffic information from the resource assembly 448 and call processing application 440. The accounting management element 414 attends to the creation and storage of billing records for calls originated or terminated to a subscriber unit 110, as well as calls forwarded to or from a subscriber unit 110. Such billing records are in the form of a call data record. The security management element 416 provides for discriminatory access to operation, administration and maintenance operations based on the given operator of the network management system 204. Various security levels are defined that determine the operations that are available to a given operator. The system management element 418 supports the start-up and recovery functions of the telecommunications system 400. It is operable to initiate tests to assess the operation of various elements and resources, and to cause the reset of such elements and resources in the event of incorrect operation.

Multiple modules 420 are provided within the resource assembly 448. Preferably, such modules are replaceable line cards that are interconnected to one another over a backplane. Particular resources are preferably provided on distinct modules 420. Alternatively, particular resources are distributed over such modules 420.

Preferably, an ethernet hub 422 allows the call processor assembly 450, the resource assembly 448 and the NMS server 444 to communicate with one another. Another ethernet hub 424 is provided to allow the NMS server 444 to communicate with both the local NMS client 442 and the remote NMS client 442*a*. That ethernet hub 424 connects to the local NMS client 442 over a wireline connection 446. That hub 424 also connects to a router 426 that further connects to a modem 428, which, in turn, connects to the remote NMS client 442*a* over the modem link 446*a*.

While the telecommunications system 400 of FIG. 4 is designed and constructed pursuant to the technical and functional specifications provided for in the current GSM standard, it should be appreciated and understood that the present invention should not be understood or construed to be so limited. Rather, the present invention is equally applicable to use with technologies and applications other than GSM, including, among others, Personal Communications Services, Code Division Multiple Access, Time Division Multiple Access and Frequency Division Multiple Access technologies, as well as those associated with wireline systems, such as tandem switching systems. A software architecture which accommodates such technologies is further described in the United States utility patent application designated by DSC Case No. 836-00 and Attorney Docket No. 24194000.182, entitled "Generic Wireless Telecommunications System," naming Anthony G. Fletcher and Scott D. Hoffpauir as inventors, filed concurrently with the instant patent application, and which is incorporated by reference herein for all purposes.

Figure 5:
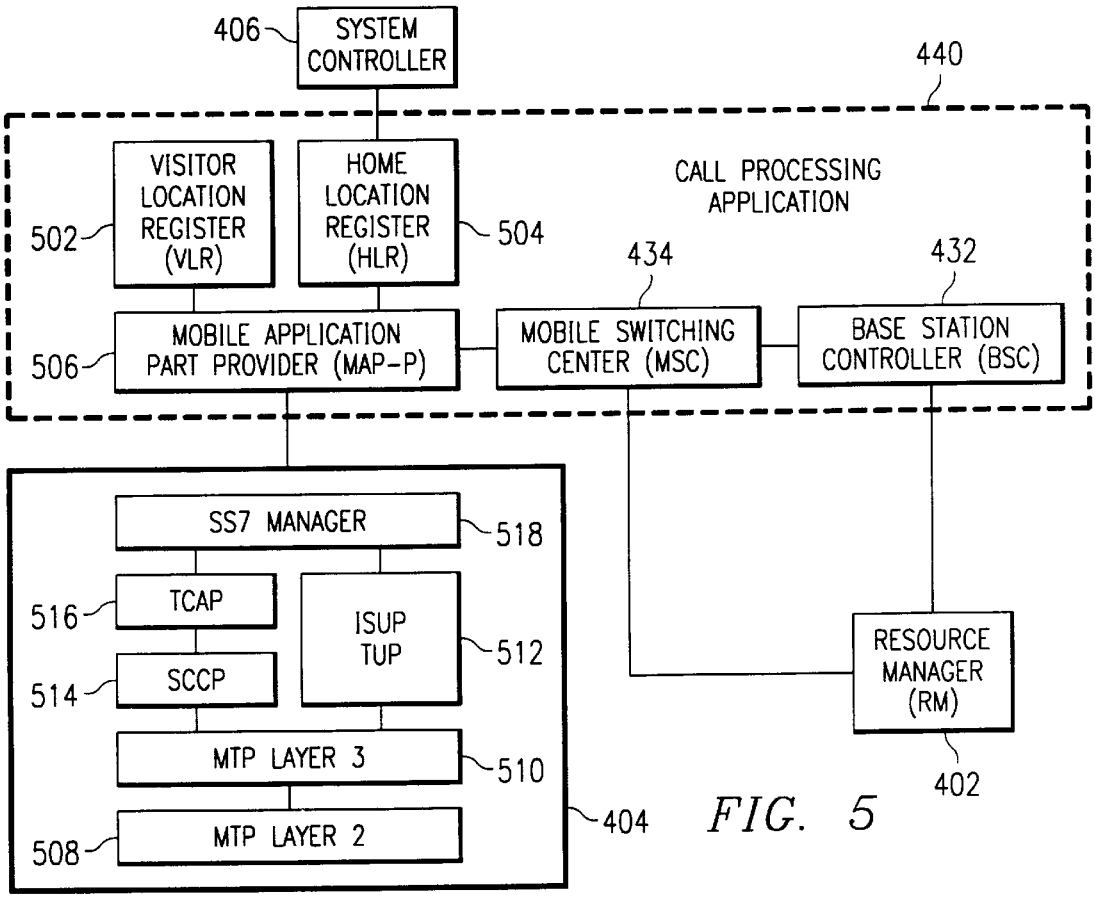
FIG. 5 is a diagram that illustrates various elements included within a call processor assembly, designed consistent with the GSM standard and in accordance with an exemplary embodiment of the present invention.

FIG. 5 illustrates various elements included within the call processor assembly 450, designed consistent with the GSM standard and in accordance with an exemplary embodiment of the present invention.

In addition to the base station controller 432 and mobile switching center 434, the call processing application 440 provides other elements that take part in processing calls directed to, or initiated by, the subscriber units 110. Specifically, the call processing application 440 includes a visitor location register 502 (abbreviated VLR), a home location register 504 (abbreviated HLR) and a mobile application part provider 506 (abbreviated MAP-P). Such elements are preferably implemented as distinct software entities.

Both the home location register 504 and the visitor location register 502 provide a database function for subscriber related information. Such subscriber related information includes subscription information for such subscribers, such as the service options to be provided to each subscriber (for example, voice mail, call waiting, call forwarding, etc.), preferences and option selections supplied by the subscribers (for example, call forwarding numbers or criteria), and the location of those subscribers. The home location register 504 provides that database function for certain set of subscribers, namely, those subscribers enrolled for service with the operator of the telecommunications system 400 or otherwise associated with the telecommunications system 400. In contrast, the visitor location register 502 provides a database function for those subscribers known to be situated in the area serviced by the telecommunications system 400 and its associated base transceiver stations 440. Those subscribers would therefore include roaming subscribers, i.e., subscribers associated with another service provider or telecommunications system for which subscriber related information is maintained externally but not in the home location register 504 of the telecommunications system 400. To obtain subscriber related information about a roaming subscriber, the visitor location register 502 of a telecommunications system 400 would therefore have to access the home location register of another operator or telecommunications system. Such access would, in turn, provide that external home location register with knowledge of the location of the roaming subscriber.

It should be appreciated that although conventional systems typically integrate functions associated with the mobile switching center 434 and the visitor location register 502, it is preferable to form distinct elements for those functions.

SS7 type signaling is provided to the telecommunications system 400 as a transport mechanism for mobile application part dialogues and out-of-band signaling with other switches. That signaling includes several parts, each having a distinct protocol. Specifically, SS7 signals include: (a) a lower layer Message Transfer Part (abbreviated MTP), which applies to call related or non-call related signaling; (b) a Signaling Connection Control Part (abbreviated SCCP) and a Transaction Capabilities Application Part (abbreviated TCAP), which apply to non-call related signaling and (c) TUP and ISUP, which apply to call related signaling. The SS7 element 404 includes elements that correspond with the aforementioned parts, namely, a MTP Layer 2 element 508, a MTP Layer 3 element 510, and ISUP/TUP element 512, a SCCP element 514 and a TCAP element 516. Through these elements, the SS7 element 404 provides functionality related to each of those elements 508–516, including global title translations and terrestrial and satellite links.

The SS7 manager 518 provides for management and cooperation with respect to the other elements of the SS7 element 404 and other elements of the call processor assembly 450, such as the resource manager 402, the mobile application part provider 506 and the mobile switching center 434.

The mobile application part provider 506 is the logical link between the visitor location register 502 and home location register 504. As such, it is directly associated with the visitor location register 502 and the home location register 504 and provides the dialogues through which they communicate with each other and with other elements. The mobile application part provider 506 provides a protocol based on the services provided by the SS7 element 404 for non-call related signaling (specifically, TCAP) for use by other elements. The specific nature of the protocol provided by the mobile application part provider 506 is dependent on the identity of such elements, which is sometimes referred to as the MAP protocol interface. For example, messages between the visitor location register 502 and an external home location register utilize one MAP protocol interface while messages between the home location register 504 and an external visitor location register utilize another MAP protocol interface. Preferably, authentication functions are integrated within the home location register 504 to provide authentication information to the home location register 504 for validating subscribers requesting service from the telecommunications system 400.

Figure 6:
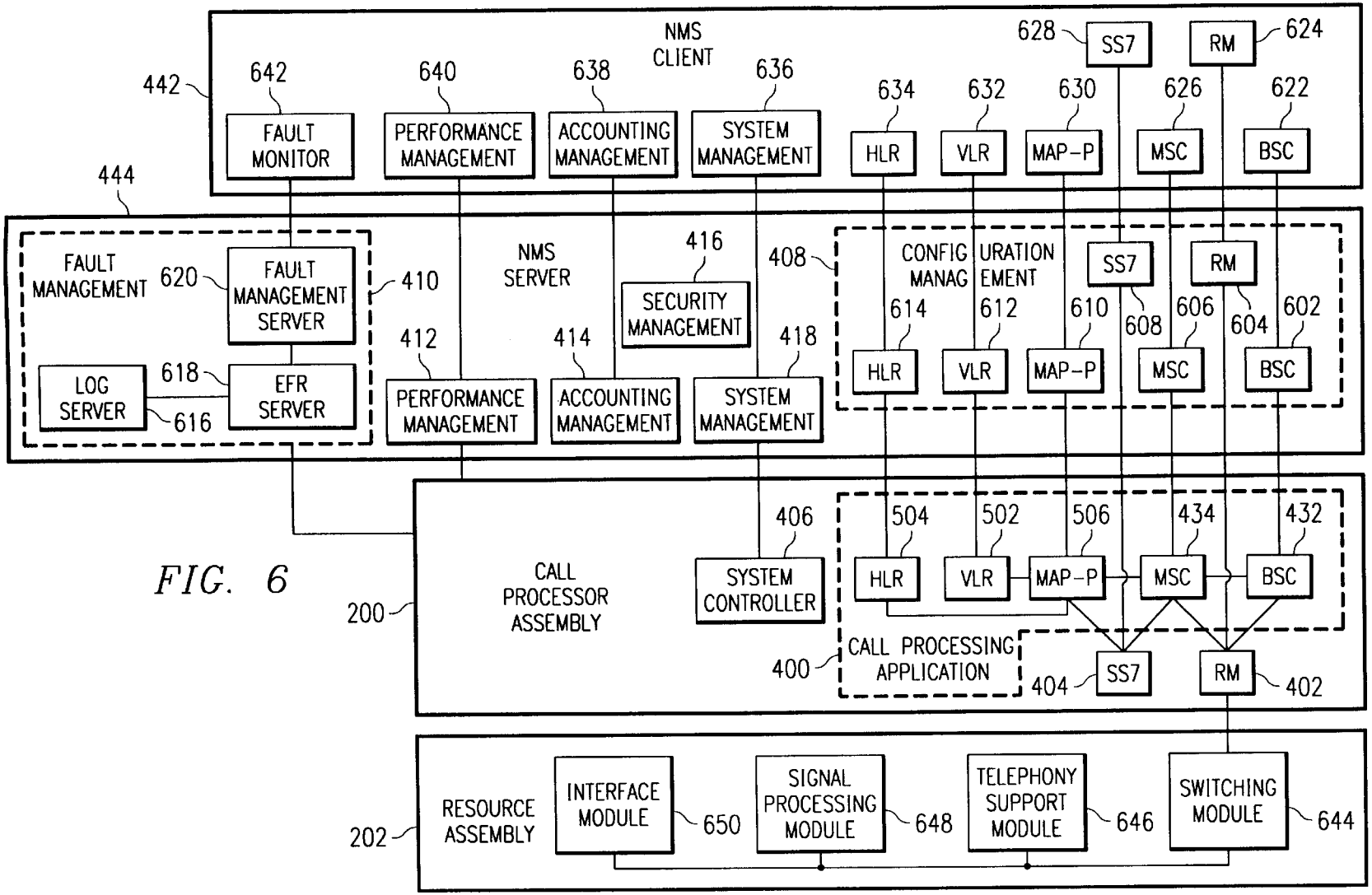
FIG. 6 is a diagram that more specifically illustrates various elements of a network management system and resources of a resource assembly, designed consistent with the GSM standard and in accordance with an exemplary embodiment of the present invention.

FIG. 6 more specifically illustrates various elements of the NMS client 442 and NMS server 444 and resources of the resource assembly 448, designed consistent with the GSM standard and in accordance with an exemplary embodiment of the present invention.

As illustrated in FIG. 6, the resource assembly 448 preferably includes a switching module 644, a telephony support module 646, a signal processing module 648 and an interface module 650. Each of those modules preferably include software and communicate with the resource manager 402 of the call processor assembly 450. As discussed more fully with respect to FIG. 7, each of those modules 644–650 preferably include specific resources that can be employed by the call processor assembly 450. Alternatively, specific resources may be distributed amongst the various modules 420. It should therefore be recognized and appreciated that the allocation of resources within the resource assembly 448 is not pertinent to the scope of the present invention.

The software architecture of the telecommunications system 400 is preferably based on object oriented software engineering technology, and the use of managed objects provided within the network management system 204. Managed objects are provided to support system logical attributes and administrative functions. Managed objects model the various functional, hardware, and interface components and subcomponents associated with the telecommunications system 400. Such software may also model the functional procedures performed by physical components. Managed objects can be created, modified, and deleted by an operator.

Preferably, the NMS server 444 includes a set of elements, which contain managed objects, that communicate with corresponding set of elements of the NMS client 442. Operators of the NMS client 442 can cause the retrieval and display of a managed object of the NMS server 444, which can then be modified by the operator. Elements of the NMS server 444 and NMS client 422, which are discussed more fully below, are preferably implemented as software entities.

There is provided elements resident within the NMS server 444 and the NMS client 442 that correspond to those functional elements provided in the call processing application 440, as well as the resource manager 402 and the SS7 element 404. Namely, the configuration management element 408 of the NMS server 444 preferably includes a BSC server 602, a RM server 604, a MSC server 606, a SS7 server 608, a MAP-P server 610, a VLR server 612 and a HLR server 614. Similarly, the NMS client 442 preferably includes a BSC client 622, a RM client 624, a MSC client 626, a SS7 client 628, a MAP-P client 630, a VLR client 632 and a HLR client 634. Such NMS client elements 622–634 are operable to provide a graphical user interface to, and receive configuration information from, an operator with respect to the associated elements of the call processor assembly 450. Such NMS server elements 602–614 are responsible for validating and storing the configuration information from such NMS client elements 622–634 for use by elements of the call processor assembly 450.

For example, an operator can make changes to reflect the addition or removal of hardware components or modifications to their operational parameters, changes to reflect the addition or removal of subscribers and to subscriber service profiles, and modify translation tables of the mobile switching center 434. Changes made by an operator are sent to the appropriate server elements of the NMS server 444 which, in turn, update local data base, notify all peer elements of the call processing application 408 of those changes, and report the completion status of the change request to the operator.

The system management server 418 of the NMS server 442 supports the start-up and recovery functions of the telecommunications system. Preferably, it is responsible for the sequential, automatic start-up of other NMS server elements by reading system start-up files and periodically polling such elements to verify their operational status and automatically restarting failed elements. It periodically requests that functional elements of the telecommunications system 400 update their stored configuration files to support system recovery. This ensures the availability of start-up files that will allow the system processors to restart at a known configuration state following a shutdown or reset. The system management client 636 of the NMS client 442 provides an operator with a list of elements residing in the telecommunications system 400, the software version and status of such elements. The operator is also provided with the ability to start, stop or query the status of individual servers through that client element 636.

The security management server 416 is preferably responsible for validating operator log-in information and restricting access to certain operations based on the operator's access class. It may also be responsible for management of user identification, passwords and access levels.

An accounting management server 414 and a corresponding accounting management client 638 are preferably respectively provided within the NMS client 442 and NMS server 444. Billing records, in the form of call data records, are reported from the accounting management server 414, which stores those records on a database associated with the NMS server 444. Such billing records may also be transferred from the accounting management server 414 to the accounting management client 638 for storage with an associated memory.

A performance management server 412 and a corresponding performance management client 640 are preferably respectively provided in the NMS client 442 and the NMS server 444. The performance management server element 412 polls the call processing application 440 for function-specific performance measurements, and generates reports and statistics based on those measurements. Such reports and statistics may be presented for display by the performance management client 640.

Alarms and fault-related events are routed from an event filtering and reporting (abbreviated EFR) server 618 to the NMS client 442 for display and to the log server 616 for storage and later processing. The NMS client 442 includes a filtering and reporting mechanism, the fault monitor 642, that allows an operator to tailor alarm, event, and state change reporting to meet specific needs.

The fault monitor 642 includes browsers that provide one or more operators with current alarm, event, alarm and state change information and maintains a consistent view of network alarm conditions. Real-time notifications are forwarded to the fault monitor from the EFR server 618. An operator has the ability to filter these notifications (messages) based on their type and severity level.

The EFR server 618 provides common services that support various elements of the NMS client. The EFR server 618 receives real-time event notifications, such as alarms, test results and billing records, generated by the call processor assembly 450 and resource assembly and other elements of the NMS server 444. The EFR server 618 is operable to filter them, and then route them to certain destinations within the telecommunications system 400.

The log control server 616 is responsible for logging functions. As such, it receives various alarm, event, and state change notifications from the EFR server 618 and stores the information to a database associated with the NMS client 442.

Figure 7:
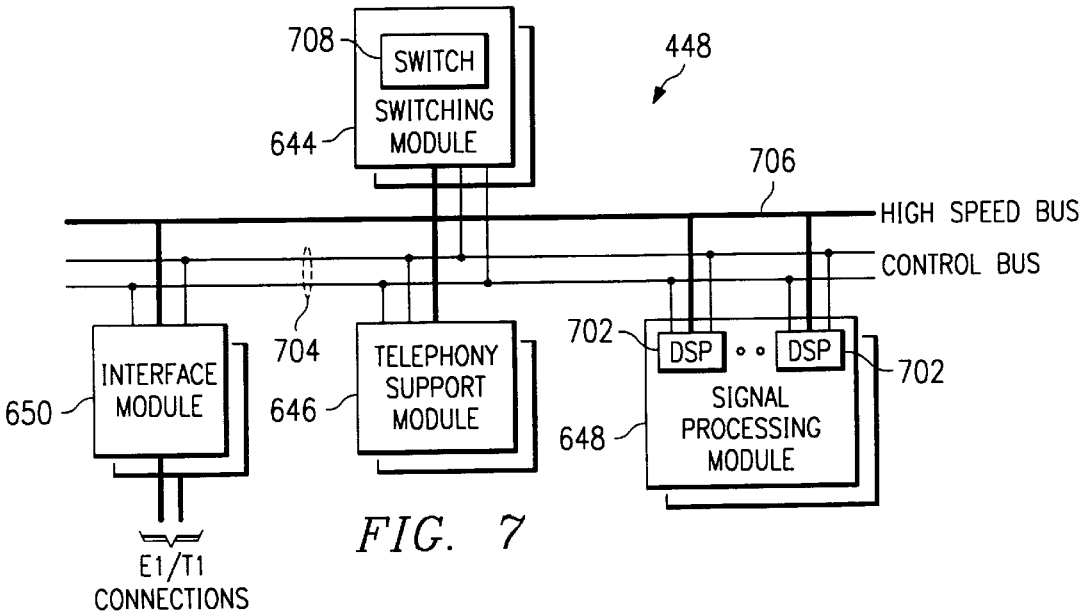
FIG. 7 is a diagram that illustrates various modules of a resource assembly, designed consistent with the GSM standard and in accordance with an exemplary embodiment of the present invention.

FIG. 7 illustrates various modules 420 of the resource assembly 448, designed consistent with the GSM standard and in accordance with an exemplary embodiment of the present invention. In accordance with an exemplary embodiment, one or more switching modules 644, interface modules 650, telephony support modules 646 and signal processing modules 648 are provided within a resource assembly 448. The interface modules 650, signal processing modules 648 and telephony support modules 646 are coupled through one or more of the switching modules 644. Control information is provided by a switching module 644 to other modules over the redundant control bus 704. Data is provided by a switching module 644 to other modules over a high speed bus 706.

A switching module 644 may be implemented in software, hardware or a suitable combination of software and hardware. A switching module 644 preferably performs switching operations, clock operations, and local communications between resources of the resource assembly 448 of the telecommunications system 400. These operations may be performed using pulse code modulation switching and data transfer techniques, Link Access Protocol on the D Channel (abbreviated LAP-D) communications and ethernet interface communications.

A switch 708 preferably resides within a switching module 644 to perform the switching functions and operations. That switch 708 may be a timeslot switch having a memory timeslot matrix to make required timeslot cross-connections within the telecommunications system 400. The switch 708 functions to set up and tear down both simplex and duplex connections between two specified channels, which may represent a call or other useful connections. For example, the switch 708 may cause a channel to connect a channel (provided by, for example, a base transceiver station 440 or a switched network 106) to a call progress tone or a voice announcement. Further, the switch 708 should be operable to set up system s defined connections upon power up and reset as well as connections for the testing of timeslots when not in use. Timeslots are preferably provided to the timeslot switch via the high speed bus 706.

A switching module 644 may also, for example, include suitable digital data processing devices, a processor, random access memory and other devices. Preferably, each switching module 644 runs a suitable operating system, and include one or more pulse code modulation bus interfaces, one or more High Level Data Link Controller (abbreviated HDLC) control bus interfaces, one or more ethernet interfaces, and an arbitration bus interface to other switching modules 644.

A telephony support module 646 may be implemented in software, hardware or a suitable combination of software and hardware. A telephony support module 646 may, for example, provide tone generation, digit transceiver functions, and digitized announcements for the telecommunications system 400. Telephony support modules 646 may also provide call setup functions, such as digit collection and out-pulsing, and call completion functions, such as digitized announcement generation and call supervisory tone generation. A telephony support module 646 may, for example, include suitable telecommunications data processing equipment, such as a processor, random access memory, one or more redundant High Level Data Link Controller bus interfaces, one or more pulse code modulation buses, and an arbitration bus for establishing active telephony support module 646 status. Preferably, a single telephony support module 646 provides all required functionality for the telecommunications system 400, and one or more additional telephony support modules 646 are used to provide redundancy in the event of component failure.

An interface module 650 is an interface device that is used to interface a suitable number of telecommunications lines that carry data in a predetermined format, such as an E1 data format, with the telecommunications system 400. Interface modules 650 provide the physical interface between the telecommunications system 400 and other equipment, a switched network 106 and base transceiver stations 440. Interface modules 650 also support in-band trunk signaling for DSO data channels that are configured for channel associated signaling, and transmit data to and receive data from a signal processing module 648. An interface module 650 may be implemented in software, hardware or a suitable combination of software and hardware. For example, an interface module 650 may include suitable data processing equipment, such as a processor, random access memory, up to four E1 ports, redundant High Level Data Link Controller bus interfaces, and pulse code modulation bus interfaces.

A signal processing module 648 is preferably used to provide an interface between a call processor assembly 450 and a signaling system. For example, signaling data may be received from a data transmission channel from the switched network 106, and may be switched to another data transmission channel, such as an E1 telecommunications channel, from an interface module 650 to a signal processing module 648 by a switching module 644. A signal processing module 648 is also preferably employed to perform transcoding and rate adaption functions, such as converting from a wireless system speech encoding format to a pulse code modulation data format, as well as other functions, such as echo cancellation functions. For example, signal processing modules 648 may be employed by telecommunications system 400 to convert data from the GSM data format to another format, such as the pulse code modulation data format.

One or more digital signal processors (abbreviated DSP) 702 are preferably provided within the signal processing module 648. A multi-channel transcoder rate adapter unit 308 is preferably implemented in a digital signal processor 702. That is, one or more digital signal processors 702 preferably incorporate functions associated with the transcoder rate adapter unit 308. Such digital signal processors 702 preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such digital signal processors 702 also has further processing power available to perform encoding and decoding of the incoming audio data. In addition to functions associated with the transcoder rate adapter 308, an echo-cancellation capability may be advantageously provided by the digital signal processors 702 by utilizing the already robust voice activity detection bits produced in transcoding a signal. An example of a single digital signal processor 702 that provides transcoding, rate adaption, and echo-cancellation functions, and using an improved decoding process, is disclosed in U.S. patent application Ser. No. 08/678,254, entitled "Multi-Channel Transcoder Rate Adapter Having Low Delay and Integral Echo Cancellation," naming James M. Davis and James D. Pruett as inventors, filed Jul. 11, 1996, and which is incorporated by reference herein for all purposes.

An E1 or T1 transmission line providing a 16,000 bits per second signal, which may carry four traffic channels, may be coupled to an interface module 650. That signal may, in turn, be connected to a digital signal processor 702 over a high speed bus 706. A digital signal processor 702 is further connected to a 64,000 bits per second transmission line also capable of carrying, for example, four traffic channels. The 64,000 bits per second transmission line can be, for example, a 64,000 bits per second PCM line. These lines are functionally bi-directional; each transmission line is connected to both an input and output of the digital signal processor 702. A digital signal processor 702 may be further connected via an address bus, a data bus, and a control bus to at least one random access memory and at least one read only memory device, in a conventional manner. A digital signal processor 702 used in this exemplary embodiment can be, for example, an Analog Devices 2106x digital signal processor chip.

A signal processing module 648 may be implemented in software, hardware or a suitable combination of software and hardware. In addition to one or more digital signal processors 702, a signal processing module 648 may include suitable data processing equipment, such as a processor, random access memory, four daughter board module ports, redundant High Level Data Link Controller bus interfaces, pulse code modulation matrix bus interfaces and other signal processing application hardware.

In operation, a subscriber unit 110 may attempt to place a call using the telecommunications system 400 by the following procedures. Signaling data and other call control data is received from a base transceiver station 440 in an E1 data format at an interface module 650. That data is then switched through a switching module 644 to a telephony support module 646, which performs call setup functions. A call processor assembly 450 receives the signaling data, and determines the call destination. Depending upon the call destination, the call processor assembly 450 sends signaling and call control data to the switched network 106, another telecommunications system, or a base transceiver station 440 serviced by the telecommunications system 400. If a telecommunications channel cannot be established, a busy signal, a no answer message, or another appropriate response is generated by the telephony support module 646, and the call attempt is terminated. If a telecommunications channel can be established, the call processor assembly 450 configures the switching module 644, telephony support module 646, interface modules 650, and signal processing module 648 to process the call data. A similar process is also used to handle incoming telecommunications channels from other telecommunications switches or the switched network 106, or to de-allocate elements of the telecommunications system 400 after the call is completed.

Figure 8:
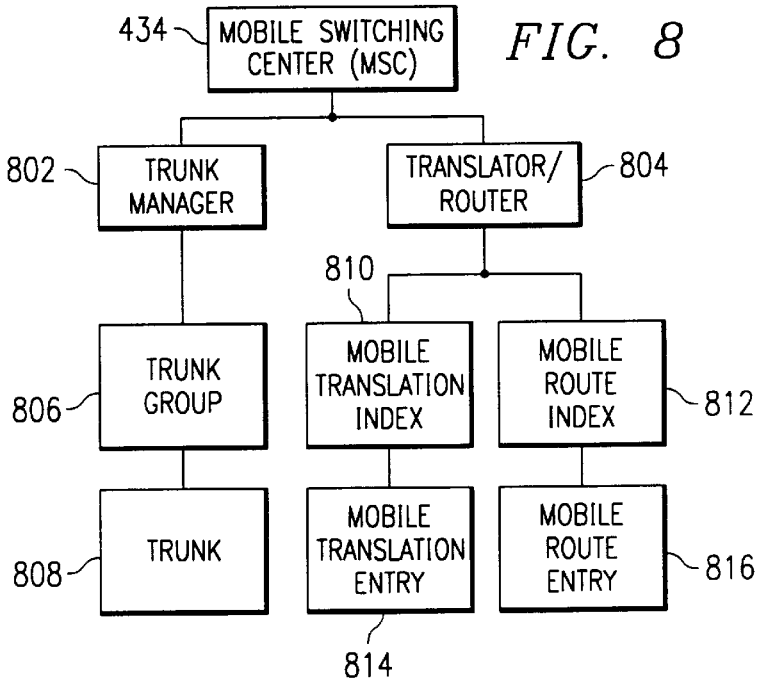
FIG. 8 is a diagram that illustrates a class hierarchy for a software entity associated with a mobile switching center, designed consistent with the GSM standard in accordance with an exemplary embodiment of the present invention.

FIG. 8 illustrates a class hierarchy for a mobile switching center 434 software entity, designed consistent with the GSM standard and in accordance with an exemplary embodiment of the present invention. A mobile switching center element 606 is preferably a software entity that includes several classes of objects, including the trunk manager class 802 and translator/router class 804.

The trunk manager class 802 is responsible for managing all trunk groups associated with the telecommunications system 400. Accordingly, a trunk group class 806 inherits from the trunk manager class 802 and models the various trunk groups associated with the telecommunications system 400. Trunk groups of the telecommunications system 400 represent a collection of trunks that are grouped to operate with common characteristics. Common characteristics of a trunk group include, for example: (a) a unique string and number that particularly identify the trunk group, (b) the destination of the trunk group, (c) the direction of the trunk group (incoming only, outgoing only or both incoming and outgoing), (d) a procedure used to select an idle trunk in the trunk group for routing a call (for example, a search forward algorithm may be employed which starts searching at the first trunk of the trunk group and continues in ascending order until an idle trunk is found), (e) a line signaling type, if any (for example, a particular type of R2), (f) a register signaling type, if any, and (g) an accepted count of incoming digits. Furthermore, each trunk group includes a series of common indices. For example, the following common indices may be provided for a given trunk group: (a) an incoming translation index (to index a table for translating incoming digits), (b) an outgoing translation index (to index a table for translating outgoing digits), and (c) a route index (to index a table for call routing).

A trunk class 808 models the various trunks associated with the telecommunications system 400. Preferably, a trunk is a specific channel, such as a DSO channel of an E1 telecommunications line, and is only within a single trunk group. A trunk is particularly identified by a unique logical component identifier. The logical component identifier identifies a trunk by the interface module 650 and the interface circuit of that interface module 650 connecting the trunk, as well as and specific time slot that constitute the trunk.

The translator/router class 804 provides for various information used by translation and routing functions—such as examining received digits, modifying received digits when required, and selecting available routing agents to connect a call—that are carried out by a mobile switching center 434. The translation and routing indices are respectively modeled by the mobile translation index class 810 and the mobile route index class 812, which each inherit from the translator/router class 804. An incoming digit sequence of a mobile call is translated by use of a mobile translation index and then routed within the telecommunications system 400 by use of a mobile route index. Both the mobile translation index and mobile route index include one or more entries, which are respectively provided for by the mobile translation entry class 814 and the mobile route entry class 816. Entries provided by those classes 814–816 includes a digit pattern, which is compared and matched to a given digit sequence, and a corresponding modified digit pattern, which is used to modify the given digit sequence if the given digit sequence matched the digit pattern.

While FIG. 8, and its associated text, describe an exemplary class hierarchy for a mobile switching center 434, it should be understood and appreciated that numerous other hierarchies could be constructed and implemented within the spirit and scope of the present invention.

Figure 9:
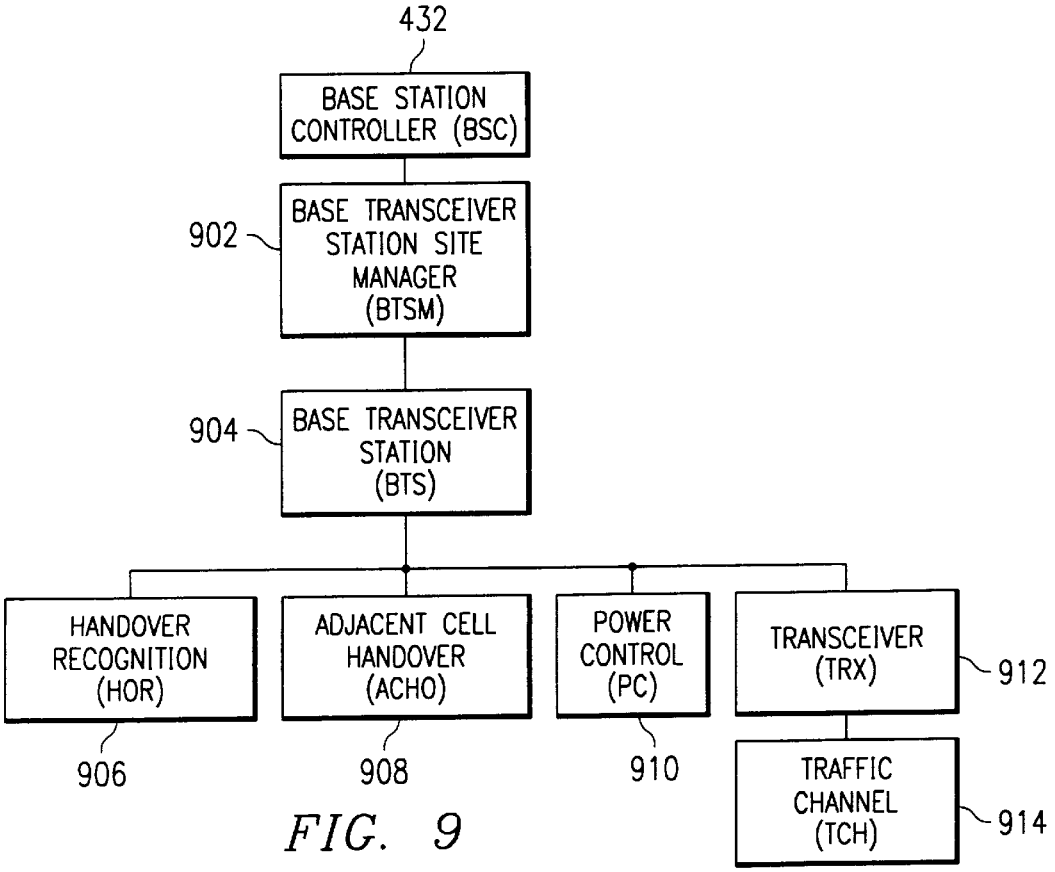
FIG. 9 is a diagram that illustrates a class hierarchy for a software entity associated with a base station controller, designed consistent with the GSM standard and in accordance with an exemplary embodiment of the present invention.

FIG. 9 illustrates a class hierarchy for a base station controller 432 software entity, designed consistent with the GSM standard and in accordance with an exemplary embodiment of the present invention.

A base station controller element 434 is preferably a software entity that includes several classes of objects, including a BTS site manager (abbreviated BTSM) class 902. A site is a logical grouping of one or more base transceiver stations 440, which are typically located in a common area. The BTSM class 902 models the operation and maintenance functionality associated with a given site, i.e. one or more given base transceiver stations 440. A base transceiver station (abbreviated BTS) class 904 inherits from the BTSM class 902 and models the functionality provided by the base transceiver stations included in a site. Other classes of objects that model specific devices or modules found in a base transceiver station 440 may also be provided and inherit from the BTSM class 902. For example, a class of objects may be provided that models power amplifier components found in a base transceiver station 440 and allows for those components to be locked, unlocked and tested by the network management system 204.

Several classes of objects inherit from the BTS class 904 and the given base transceiver stations 440 it models, namely, a transceiver (abbreviated TRX) class 912, a power control (abbreviated PC) class 910, a handover recognition (abbreviated HOR) class 906, and an adjacent cell handover (abbreviated ACHO) class 908. The TRX class 912 models each radio transceiver associated with a carrier frequency associated with the given base transceiver stations 440, and manages speech, rate adaption, channel encoding and decoding and frame building functions of the transceiver. The PC class 910 maintains and provides information used by power control techniques and algorithms employed by the subscriber units 110 and the given base transceiver stations 440. The HOR class 906 maintains and provides information necessary to carry out handover procedures from one cell to a target cell. More specifically, that object class maintains and provides criteria for the generation of a preferred target list by subscriber units 110 and information for the handover algorithm employed by the given base transceiver stations 440. The ACHO class 908 maintains and provides information used in connection with the handover and selection procedures associated with a particular cell. Through the ACHO class 908, knowledge of which cells can handover calls to other cells is provided. Preferably, the ACHO class 908 provides for an object for each adjacent cell to which a particular base transceiver station 440 may handover a call. In other words, each base transceiver station 440 preferably has an object of the ACHO class 908 for each other base transceiver station 440. For instance, if there are five base transceiver stations 440 that may handoff calls to each other ($BTS_{13}$ 0 through $BTS_{13}$ 4), then four objects should be created for each of the five base transceiver stations 440. For example, with respect to $BTS_{13}$ 0, a first object would be needed for a $BTS_{13}$ 0 to $BTS_{13}$ 1 handoff, a second object would be needed for a $BTS_{13}$ 0 to $BTS_{13}$ 2 handoff, a third object would be needed for a $BTS_{13}$ 0 to $BTS_{13}$ 3 handoff, a fourth object would be needed for a $BTS_{13}$ 0 to $BTS_{13}$ 4 handoff.

A channel (abbreviated CH) class 914 inherits from the TRX class 912, and models each of the physical channels and their associated radio timeslots that are related with a given transceiver. Preferably, eight physical channels are provided by each transceiver.

While FIG. 9, and its associated text, describe an exemplary class hierarchy for a base station controller 434, it should be understood and appreciated that numerous other hierarchies could be constructed and implemented within the spirit and scope of the present invention.

Figure 10:
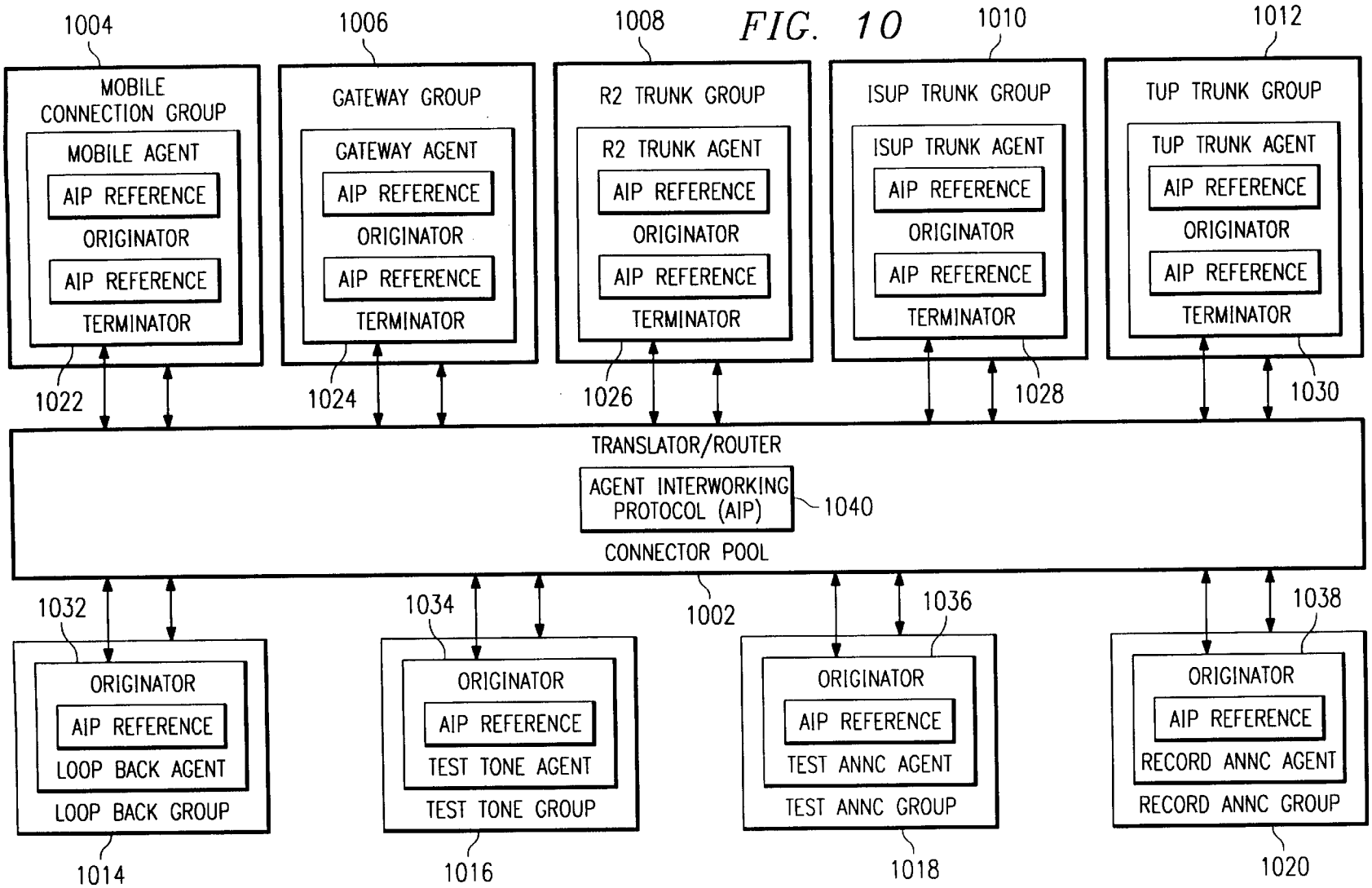
FIG. 10 is a diagram that illustrates a translator/router and associated agent groups of a mobile switching center, designed consistent with the GSM standard and in accordance with an exemplary embodiment of the present invention.

FIG. 10 illustrates a translator/router 1002 and associated agent groups 1004–1020 of a mobile switching center 434, designed consistent with the GSM standard and in accordance with an exemplary embodiment of the present invention. The translator/router 1002 and the associated agent groups 1004–1020 are each preferably implemented in software within the mobile switching center 434. The translator/router 1002 manages call translations and routing functions for all agents. When a subscriber unit 110 originates a call, the subscriber unit's dialed number is transferred, as it is dialed, to the telecommunications system 400. A translation process, implemented in the translator/router 1002, converts the dialed number into a generically formatted telephone number. The translation process may include, for example, the prefixing of (e.g., stripping off) area codes, long distance or international codes and conversion of short codes into telephone numbers or any other mapping/formatting action decided by the operator of the telecommunication system 100. The dialed number may also pass without translation. After translation, the router function of the translator/router 1002 routes the translated number towards the correct destination. The router function utilizes routing tables to map a translated number to a route list that contains an ordered list of routes. Routes correspond to, for example, trunk group names, subscriber unit terminations, call delivery features or test circuits. The destination may be, for example, a specific outgoing trunk group directed to a switched network 106 or to a voice mail system or to another subscriber unit 110 serviced by the telecommunications system 400. For a call terminating at a subscriber unit 110, once the call arrives at the mobile switching center 434 servicing the subscriber unit 110, no translation or routing is necessary and the call is set up to the subscriber unit 110.

The translator/router 1002 is connected to a series of agent groups 1004–1020. Agent groups 1004–1020 include, for example, a mobile group 1004, gateway group 1006, R2 trunk group 1008, ISUP trunk group 1010, TUP trunk group 1012, loop back group 1014, test tone group 1016, test announcement group 1018 and record announcement group

1020. Each group includes agents with the same characteristics. For example, the mobile group 1004 includes mobile agents 1022 so that there is a mobile agent 1022 for each trunk (e.g., one agent represents one call half). Similarly, the gateway group 1006 includes gateway agents 1024, R2 trunk group 1008 includes R2 trunk agents 1026, ISUP trunk group 1010 includes ISUP trunk agents 1028, TUP trunk group 1012 includes TUP trunk agents 1030, loop back group 1014 includes loop back agents 1032, test tone group 1016 includes test tone agents 1034, test announcement group 1018 includes test announcement agents 1036 and record announcement group 1020 includes record announcement agents 1038.

Each agent is operable to carry out certain functions. For example, mobile agents 1022 are responsible for establishing a mobile originated or mobile terminating connection between the mobile switching center 434 and a subscriber unit 110. Mobile agents 1022 may also be responsible for interworking with a second agent in the role of call originator or terminator. As another example, R2 trunk agents 1026 are responsible for establishing a connection between the mobile switching center 434 and a switched network using the R2 protocol and also interworking with another agent in the role of call originator or terminator. As yet another example, gateway agents 1024 are responsible for routing subscriber unit 110 terminating calls.

As illustrated in FIG. 10, the translator/router 1002 is the central hub for the agents 1022–1038. The translator/router 1002 includes a connector pool, which preferably utilizes an agent interworking protocol (abbreviated AIP) 1040, of available connectors. Each connector is preferably identified by a unique reference number that can be used by the originating and terminating agents to facilitate connection of the agents to the same connector.

Further details of the translator/router 1002, the groups 1004–1020 and agents 1022–1038 as well as associated technology and operations are more fully set forth in the United States utility patent application entitled "Agent Interworking Protocol and Call Processing Architecture for a Communication System," designated by DSC Case No. 830-00 and Attorney Docket No. 24194000.176, naming Scott D. Hoffpauir, Steve B. Liao and Kelvin K. Kinsey as inventors, filed contemporaneously with the instant patent application, and which is incorporated by reference herein for all purposes.

Figure 11:
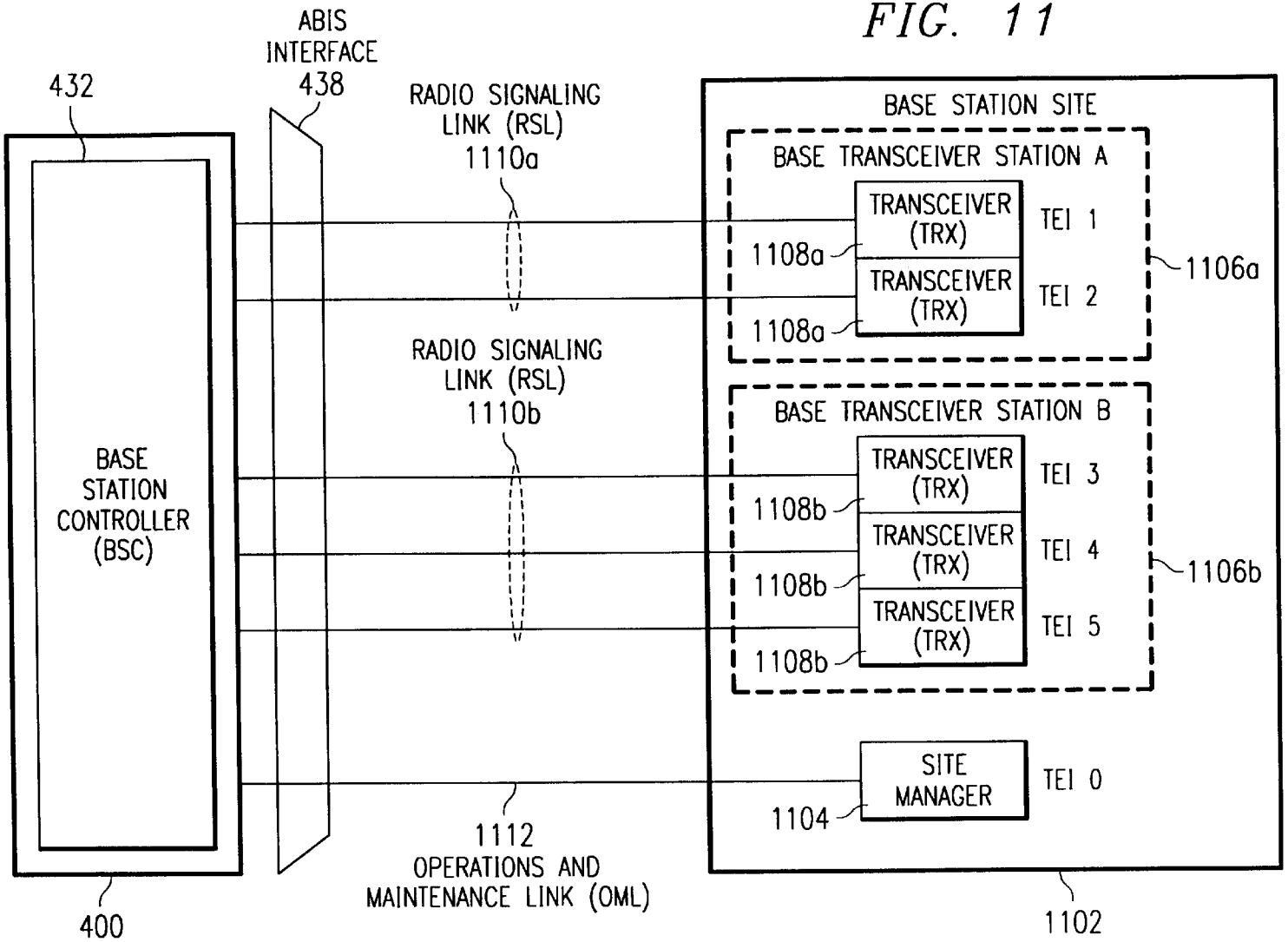
FIG. 11 is a diagram that illustrates a base station site, and logical connections between the base station controller and the base station site, designed consistent with the GSM standard and in accordance with an exemplary embodiment of the present invention.

FIG. 11 illustrates a base station site 1102, and logical connections between the base station controller element 432 and the base station site 1102, designed consistent with the GSM standard and in accordance with an exemplary embodiment of the present invention. A base station site 1102 is logically constructed to include one or more base transceiver stations, including one or more transceivers, in addition to a site manager 1104. The base station site 1102 illustrated in FIG. 11 includes two base transceiver stations, BTS-A 1106*a* and BTS-B 1106*b*, which respectively include two transceivers 1108*a* and three transceivers 1108*b*. The site manager 1104 provides for various administrative functions, such as software administration, software download, and necessary operation and maintenance functions within a base transceiver station 1106. A transceiver is associated with one carrier frequency of a base transceiver station 1106, and preferably provides for multiple physical channels over the radio interface. It manages the rate adaption, channel encoding, channel decoding and frame alignment of those traffic channels. A physical channel of a transceiver 1108 is preferably associated with, and represents, a particular timeslot. Physical channels may be divided into logical channels, such as traffic channels, common channels and dedicated channels. Common channels handle information for a subscriber unit 110 during transition from an idle mode to a dedicated mode, whereas dedicated channels handle speech transmissions and point-to-point signaling (they are allocated after call setup but before a traffic channel is allocated). Examples of types of common channels pursuant to the GSM standard include the broadcast control channel (abbreviated BCCH), the common control channel (abbreviated CCCH), which includes the paging and access grant channel (abbreviated PAGCH) and the random access channel (abbreviated RACH), the frequency control channel (abbreviated FCCH) and the synchronization channel (abbreviated SCH). Examples of types of dedicated channels pursuant to the GSM standard include the slow associated control channel (abbreviated SACCH), the fast associated control channel (abbreviated FACCH) and the standalone dedicated control channel (abbreviated SDCCH).

The Abis interface 438, which is interposed between the base station controller 432 and the base station site 1102, is used for the transport of signaling messages in addition to voice and data traffic. Such messages include, for example, configuring and controlling the base station site 1102. The Abis interface 438 may include a physical layer for the transport of speech and signaling information and one or more logical layers providing one or more logical links. In accordance with an exemplary embodiment of the present invention, two logical links are provided, namely, a radio signaling link 1110 and an operations and maintenance link 1112. Radio signaling links 1110 are used to establish, release and maintain radio connections with a subscriber unit 110. Preferably, there is a radio signaling link 1110 assigned to a given transceiver 1108. Operations and maintenance links 1112 are provided for the management of the base station site 1102, including configuration, fault, performance, software and test management functions. Preferably, there is an operations and maintenance link 1112 assigned to a given site manager 1104.

A base station site 1102 preferably has at least two addressable entities: transceivers 1108 and a site manager 1104. Messages may be mapped onto a single timeslot transported over the Abis interface 438 for a given entity of the base station site 1102. Accordingly, such entities are preferably distinguished from one another by employing an addressing mechanism. For example, a terminal endpoint identifier (abbreviated TEI) may be assigned with each different entity of the base station site 1102 to identify a specific point-to-point connection. As illustrated in FIG. 11, the site manager 1102 is provided with the address "TEI 0," the transceivers 1108*a* of the first base transceiver station 1106*a* (referred to as BTS-A) are assigned addresses "TEI 1" and "TEI 2," and the transceivers 1108*b* of the second base transceiver station (referred to as BTS-B) are assigned addresses "TEI 3," "TEI 4" and "TEI 5."

It should be appreciated that multiple base station sites 1102 may be connected to the telecommunications system 400 in various ways. For example, base station sites 1102 may be interconnected in a star configuration with respect to the telecommunications system 400 wherein each base station site 1102 has a dedicated link 120 to the telecommunications system 400, or in a multidrop configuration series with respect to one another with respect to the telecommunications system 400 wherein the base station sites 1102 share the same link 120.

Figure 12:
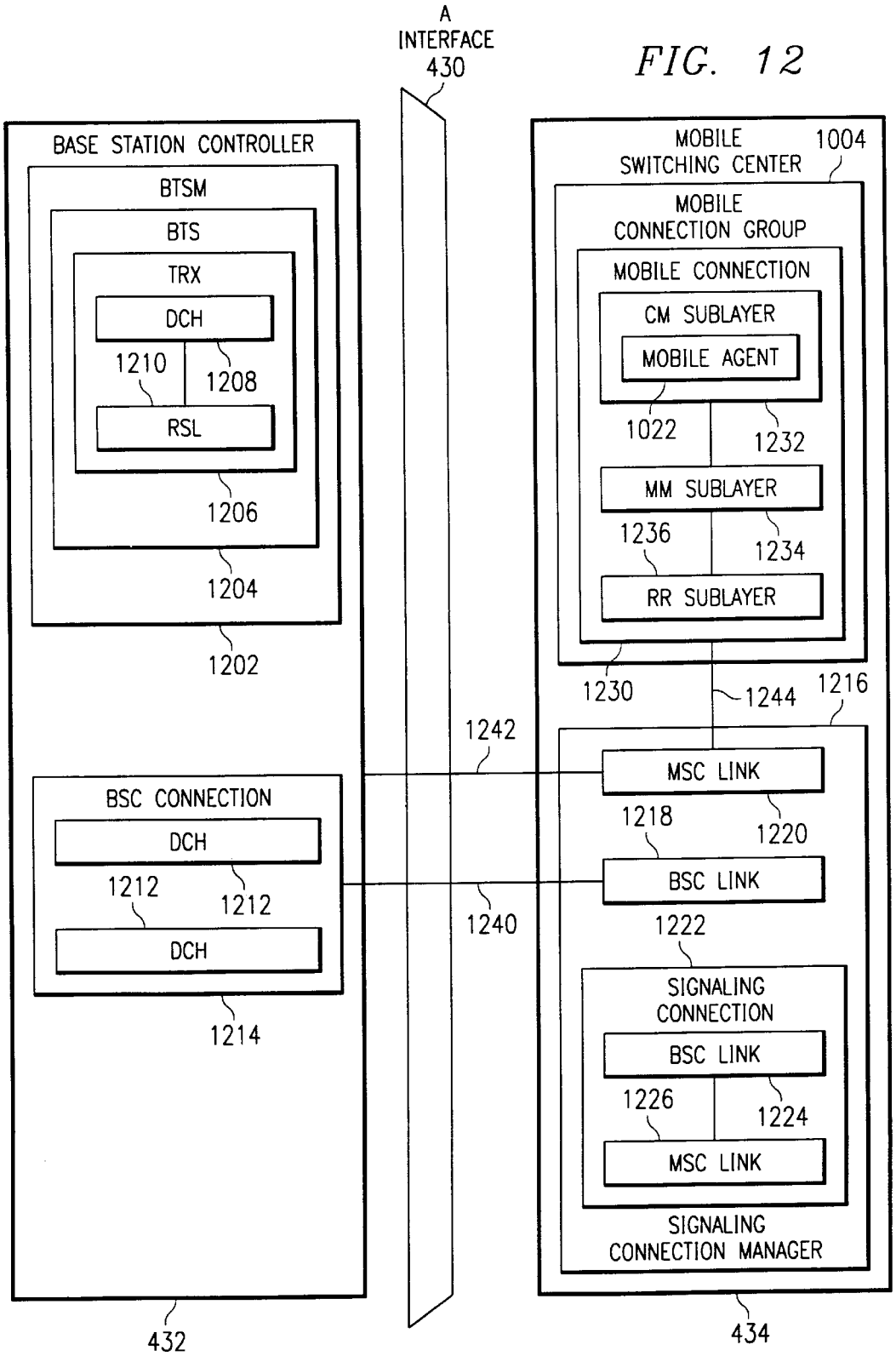
FIG. 12 is a diagram that illustrates the logical connections formed between a base station controller and a mobile switching center, designed consistent with the GSM standard and in accordance with an exemplary embodiment of the present invention.

FIG. 12 illustrates the logical connections formed between the base station controller 432 and mobile switching center 434, designed consistent with the GSM standard and in accordance with an exemplary embodiment of the present invention. The base station controller 432 preferably includes several software objects for management of the radio interfaces associated with one or more base station sites 1102, including the allocation, release and handover of radio channels. Such objects may include Base transceiver station manager (abbreviated BTSM) objects 1202 to model the various site managers 1104, and BSC connection objects 1214 to manage various connections between the base station controller 432 and the mobile switching center 434. One or more base transceiver station (abbreviated BTS) objects 1204 are provided for each BTSM object 1202 to model the various base transceiver stations 440 within a given base station site 1102. Similarly, one or more transceiver (abbreviated TRX) objects 1206 are provided for each BTS object 1204 to model the various transceivers 1108 within a given base transceiver station 1106. A radio signaling link (abbreviated RSL) object 1210 is associated with each TRX object 1206, and models the radio signaling link 1110 associated with each transceiver 1108. One or more dedicated channel (abbreviated DCH) objects 1208 are, in turn, provided for each RSL object 1210. Such DCH objects 1208 are dynamically allocated to a connection by a TRX object 1206. Corresponding DCH objects 1212 may also be provided for within a BSC connection object 1214.

A mobile switching center 434 also preferably includes several software objects for call setup with respect to subscriber units 110, including location updating, handover and call delivery functions. Such objects may include a mobile connection group object 1004 to track and administer the various connections to and from subscriber units 110, and a signaling connection manager object 1216 to associate and manage various connections between the base station controller 432 and the mobile switching center 434.

A mobile connection group object 1004 provides for one or more connections to a subscriber unit 110, which are separately modeled by a mobile connection object 1230. A mobile connection object 1230 includes three sublayers, namely, a connection management (abbreviated CM) sublayer object 1232, a mobility management (abbreviated MM) sublayer object 1234, and a radio resource (abbreviated RR) sublayer object 1236.

A CM sublayer object 1232 provides call connection procedures employed to originate and terminate calls with respect to subscriber units 110. A CM sublayer object 1232 further includes a mobile agent 1022, which is operable to actively control and guide the operation of the sublayer objects 1232–36 to establish a call originated or terminated by a subscriber unit 110.

A MM sublayer object 1234 provides for procedures concerning the collection and use of location information of a subscriber unit 110 that is needed to route calls to a subscriber unit 110. Such procedures may, for example, involve: (a) location updating whereby a subscriber unit 110 provides notification of the identity of its location area (notification can be periodic or upon a change in location area), (b) detachment whereby a subscriber unit 110 provides a notification upon its deactivation to prevent call completion to that unit, and (c) attachment whereby a subscriber unit 110 provides a notification upon its activation to allow for call completion to that unit.

A RR sublayer object 1236 provides for procedures that establish, maintain and release stable connections between the mobile switching center 434 and subscriber units 110. Such procedures may, for example, involve channel assignment whereby a full-rate traffic channel is assigned to a subscriber unit 110 during an active connection, paging of a subscriber unit 110, handover of a traffic channel from one transceiver 1108 to another, detecting and reporting radio connection failures and problems, and release of a radio connection.

The signaling connection manager object 1216 includes one or more BSC link objects 1218 and MSC link objects 1220. There is preferably a BSC link object 1218 that corresponds to each BSC connection object 1214. There is also preferably a MSC link object 1220 that corresponds to each mobile connection object 1230. The signaling connection manager object 1216 further includes one or more signaling connection objects 1222. Corresponding BSC link objects 1224 and MSC link objects 1226 may also be provided within a signaling connection object 1222. The signaling connection object 1222, by use of the BSC link object 1224 and MSC link object 1226 provided within it, is operable to associate a given BSC connection object 1214 with a corresponding mobile connection object 1230.

In accordance with an exemplary operation, connection related messages (e.g., call setup messages) are transferred from a base station controller 432 to a mobile switching center 434 as follows. A RSL message is provided by a given transceiver 1108 to the RSL object 1210 (of the TRX object 1206). That RSL object 1210 passes that message to the DCH object 1208 of the TRX object 1206 and, as a consequence, to the corresponding DCH object 1212 residing within the BSC connection object 1214. Via a binding 1240, the BSC connection object 1214 passes the message to the BSC link 1218 of the signaling connection manager 1216 and, as a consequence, the BSC link 1224 residing within the signaling connection object 1222. That BSC link object 1224 is then able to pass the message to the MSC link object 1226, which also resides within the signaling connection object 1222, and, as a consequence, to the MSC link object 1220 of the signaling connection manager 1216. Via another binding 1244, the MSC link object 1220 passes the message to the mobile connection object 1230. In turn, the message is consecutively passed to the RR sublayer 1236, MM sublayer 1234 and CM sublayer 1232, before being finally passed to the mobile agent 1022. Connection related messages (e.g., call setup messages) transferred from a mobile switching center 434 to a base station controller 432 are accomplished in the same manner as described above, except in a reversed order. Preferably, the connection related messages that are passed between a mobile switching center 434 and a base station controller 432 are consistent with one or more common protocols, such as the BSSMAP protocol. By using common protocols, the telecommunications system 400 may later be readily modified to provide for an external A interface as opposed to an internal A interface 430.

In accordance with an exemplary operation, messages that are not connection related (e.g., paging a subscriber unit 110) are transferred from a mobile switching center 434 to a base station controller 432 as follows. A mobile agent 1232 originates a message, and passes that message consecutively to the CM layer 1232, MM sublayer 1234 and RR sublayer 1236, before being finally passed to the mobile connection object 1230. Such mobile connection object 1230 then passes the message to the MSC link 1220 of the signaling connection manager 1216. Via a binding 1242, that message is passed to the base station controller 432.

The present invention is well adapted to carry out the objects and attain the ends and advantages mentioned, as well as others inherent therein. While an exemplary embodiment of the invention have been given for the purposes of disclosure, alternative embodiments, changes and modifications in the details of construction, interconnection and arrangement of parts will readily suggest themselves to those skilled in the art after having the benefit of this disclosure. This invention is not necessarily limited to the specific embodiment and examples illustrated and described above. All embodiments, changes and modifications encompassed within the spirit of the invention are included, and the scope of the invention is defined by a proper construction of the following claims.

What is claimed is:

1. A telecommunications system connected to one or more base stations that are operable to communicate with multiple subscriber units, comprising:

a radio controller to control the operation of the base station(s); and a switching center to switch calls directed to and from the subscribers units.

2. The telecommunications system according to claim 1, further comprising a transcoder and rate adapter unit for transcoding and adapting the rate of signals received from the base station(s).

3. The telecommunications system according to claim 1, further comprising a switch that is utilized by both the radio controller and the switching center.

4. The telecommunications system according to claim 3, wherein the switch comprises a switching matrix.

5. The telecommunications system according to claim 1, wherein the radio controller comprises one or more software entities.

6. The telecommunications system according to claim 1, wherein the switching center comprises one or more software entities.

7. The telecommunications system according to claim 1, wherein the radio controller and the switching center each comprise one or more software entities that are operable to form logical connections to one another.

8. The telecommunications system according to claim 1, wherein the telecommunications system communicates with the base station(s) by a link level protocol.

9. A GSM telecommunications system connected to one or more base transceiver stations that are operable to communicate with multiple subscriber units, comprising:

a base station controller to control the operation of the base station(s); and a mobile switching center to switch calls directed to and from the subscribers units.

10. The GSM telecommunications system according to claim 9, further comprising a transcoder and rate adapter unit to translate signals directed to or from the base transceiver station(s).

11. The GSM telecommunications system according to claim 9, further comprising a switch utilized by both the radio controller and the switching center.

12. The GSM telecommunications system according to claim 9, wherein the base station controller comprises one or more software entities.

13. The GSM telecommunications system according to claim 9, wherein the mobile switching center comprises one or more software entities.

14. The GSM telecommunications system according to claim 9, wherein the base station controller and the mobile switching center each comprise one or more software entities that are operable to form logical connections to one another.

15. The GSM telecommunications system according to claim 9, wherein the GSM telecommunications system communicates with the base transceiver station(s) by a link level protocol.

16. The GSM telecommunications system according to claim 9, wherein the base transceiver station(s) communicate with the multiple subscriber units by usage of a plurality of radio channels and the base transceiver station(s) are connected to the GSM telecommunications system over one or more telecommunications lines that carry a plurality of digital channels, and wherein a given digital channel transmits information associated with more than one radio channel to the GSM telecommunication system.

17. A telecommunications system connected to one or more base stations that are operable to communicate with multiple subscriber units, comprising:

a resource assembly connected by one or more telecommunications lines to the base station(s); and a call processor assembly, connected to the resource assembly, which includes a radio controller to control the operation of the base transceiver station(s) and a switching center to control switching calls directed to and from the subscriber units.

18. The telecommunications system according to claim 17, wherein the resource assembly includes a transcoder rate adapter unit to convert and adapt the rate of signals directed to or from the base station(s).

19. The telecommunications system according to claim 17, wherein the resource assembly includes a switch which can be utilized by the radio controller and switching center.

20. The telecommunications system according to claim 17, wherein the resource assembly includes an echo canceler to cancel echo from calls directed to or from the subscriber units.

21. The telecommunications system according to claim 17, wherein the resource assembly includes one or more digital signal processors configured to translate signals directed to or from the base station(s).

22. The telecommunications system according to claim 17, wherein the resource assembly includes one or more digital signal processors configured to perform echo cancellation functions with respect to signals directed to or from the base station(s).

23. The telecommunications system according to claim 17, wherein the telecommunications system further comprises a network management system connected to, and operable to configure and store information associated with, the resource assembly and the call processor assembly.

24. The telecommunications system according to claim 17, further comprising a resource manager, connected to the resource assembly, radio controller and switching center, which is operable to communicate information from the radio controller and switching center to the resource assembly.

25. The telecommunications system according to claim 17, wherein the call processor assembly further includes:

a home location register to maintain information concerning those multiple subscriber units associated with the telecommunications system;

a visitor location register to maintain information concerning the multiple subscriber units, whether or not associated with the telecommunications system; and a mobile application part provider, connected to the switching center, the home location register and the visitor location register, which is operable to provide mobile application part protocols for use by the home location register and the visitor location register.

26. A call processor assembly, comprising:

a base station controller to control the operation of one or more base stations that communicate with multiple subscriber units;

a mobile switching center to switch calls directed to and from the subscribers units;

a home location register to maintain information concerning those multiple subscriber units associated with the telecommunications system;

a visitor location register to maintain information concerning the multiple subscriber units, whether or not associated with the telecommunications system; and a mobile application part provider, connected to the mobile switching center, the home location register and the visitor location register, which is operable to provide mobile application part protocols for use by the home location register and the visitor location register.

27. The call processor assembly according to claim 26, wherein the base station controller, the mobile switching center, the home location register, the visitor location register and the mobile application part provider each comprise software entities.

* * * * *